US012602400B1

(12) United States Patent　　　　(10) Patent No.:　US 12,602,400 B1
Ghosh et al.　　　　　　　　　　　　(45) Date of Patent:　　Apr. 14, 2026

(54) CONSISTENT DATA DELIVERY IN AN EVENTUALLY CONSISTENT SYSTEM

(71) Applicant: Intuit Inc., Mountain View, CA (US)

(72) Inventors: Suman Ghosh, Bengaluru (IN); Susheel Kiran Javadi, Bengaluru (IN); Shweta Kisan Gawade, Bengaluru (IN); Tushar Singhal, Bengaluru (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/195,619

(22) Filed: Apr. 30, 2025

(30) Foreign Application Priority Data

Jan. 31, 2025　(IN) ............................ 202541008209

(51) Int. Cl.
　　*G06F 16/27*　　　(2019.01)
　　*G06F 16/23*　　　(2019.01)
(52) U.S. Cl.
　　CPC .......... *G06F 16/27* (2019.01); *G06F 16/2365* (2019.01)
(58) Field of Classification Search
　　CPC .............................. G06F 16/27; G06F 16/2365
　　USPC .......................................................... 707/652
　　See application file for complete search history.

(56) References Cited

U.S. PATENT DOCUMENTS

| | | | |
|---|---|---|---|
| 11,250,019 B1 * | 2/2022 | Goyal | G06F 16/24568 |
| 2020/0320095 A1 * | 10/2020 | Haase | G06F 16/2379 |
| 2021/0165767 A1 * | 6/2021 | D'Halluin | G06F 16/1734 |

* cited by examiner

*Primary Examiner* — Robert W Beausoliel, Jr.
*Assistant Examiner* — Lauren Zannah Ganger
(74) *Attorney, Agent, or Firm* — Dinsmore & Shohl LLP

(57)　　　　　ABSTRACT

Certain aspects of the disclosure provide techniques for delivering consistent data in an eventually consistent system. An example method includes storing a first data table comprising a trigger timestamp; storing a second data table comprising a commit timestamp and an adaptor offset corresponding to a latest capture change data (CDC) event recorded in a categorized data stream; determining that the commit timestamp is later than or the same as the trigger timestamp; storing a third data table comprising a file writer offset corresponding to a latest data file stored in a file storage system; determining that the file writer offset is greater than or equal to the adaptor offset; causing the data files stored in the file storage system to be transmitted to and stored in a data lake; and generating and transmitting a notification comprising an indication that the data lake is up-to-date as of the trigger timestamp.

20 Claims, 12 Drawing Sheets

Data Pipelines Table
402

| group_name | varchar(100) | No | | Null | | |
|---|---|---|---|---|---|---|
| table_full_name | varchar(256) | No | PRI | Null | | |
| pipeline_name | varchar(256) | Yes | | Null | | |
| latest_commit_timestamp | timestamp(6) | Yes | | Null | | |

*FIG. 4*

Trigger Latest Offset Table
502

| Field | Type | Null | Key | Default | Extra |
|---|---|---|---|---|---|
| group_name | varchar(100) | No | | Null | |
| table_full_name | varchar(256) | No | PRI | Null | |
| latest_offset | bigint(20) | Yes | | Null | |
| latest_commit_timestamp | timestamp(6) | Yes | | Null | |
| file_writer_offset | bigint(20) | Yes | | Null | |
| latest_update_date | timestamp(6) | No | | Null | |

*FIG. 5*

Trigger Adaptor Snapshot Table
802

| | | | | | |
|---|---|---|---|---|---|
| group_name | varchar(100) | No | | Null | |
| table_full_name | varchar(256) | No | PRI | Null | |
| offset | bigint(20) | Yes | | Null | |
| commit_timestamp | timestamp(6) | Yes | | Null | |
| latest_update_date | timestamp(6) | Yes | | Null | |

FIG. 8

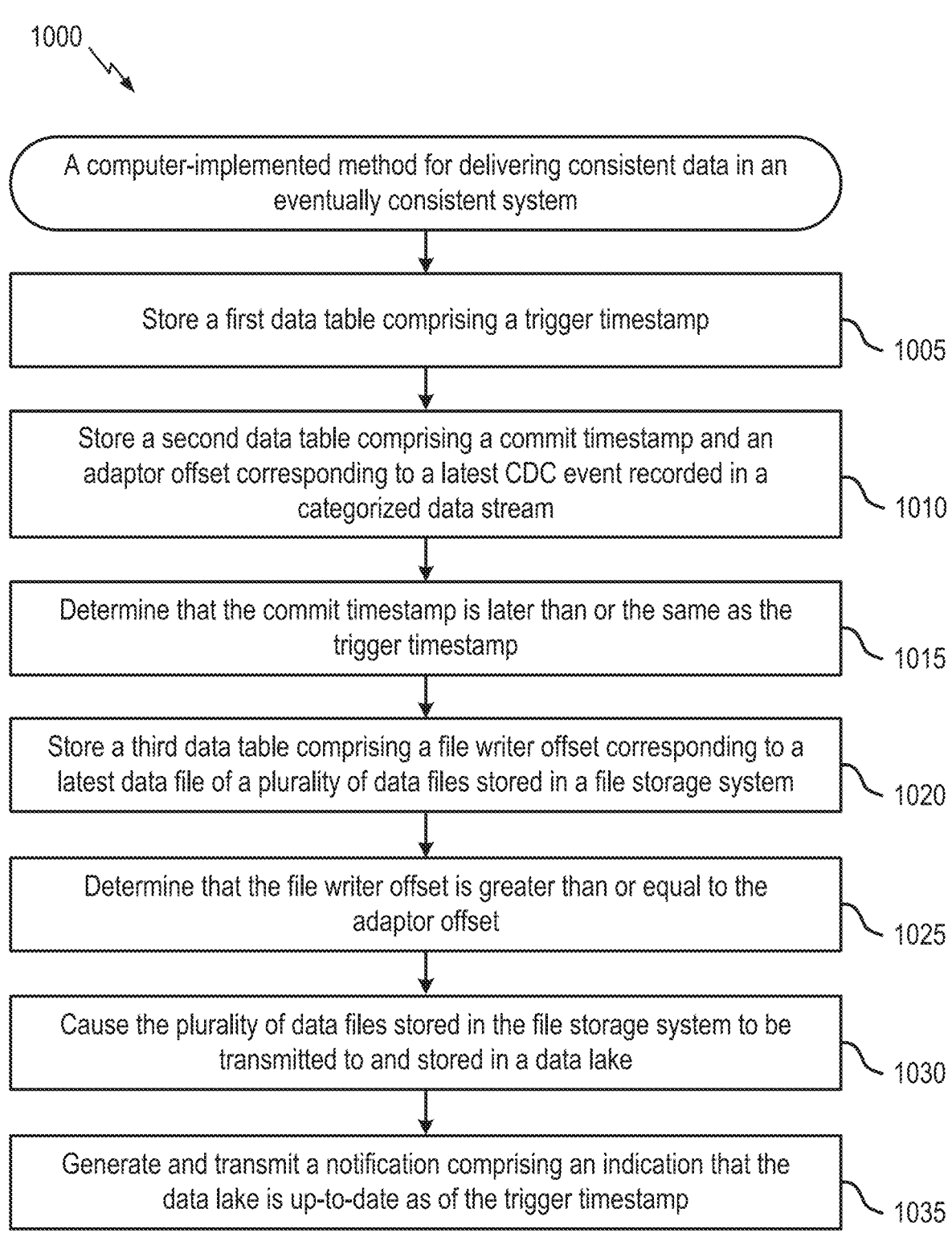

1000

A computer-implemented method for delivering consistent data in an eventually consistent system Store a first data table comprising a trigger timestamp — 1005

Store a second data table comprising a commit timestamp and an adaptor offset corresponding to a latest CDC event recorded in a categorized data stream — 1010

Determine that the commit timestamp is later than or the same as the trigger timestamp — 1015

Store a third data table comprising a file writer offset corresponding to a latest data file of a plurality of data files stored in a file storage system — 1020

Determine that the file writer offset is greater than or equal to the adaptor offset — 1025

Cause the plurality of data files stored in the file storage system to be transmitted to and stored in a data lake — 1030

Generate and transmit a notification comprising an indication that the data lake is up-to-date as of the trigger timestamp — 1035

*FIG. 10*

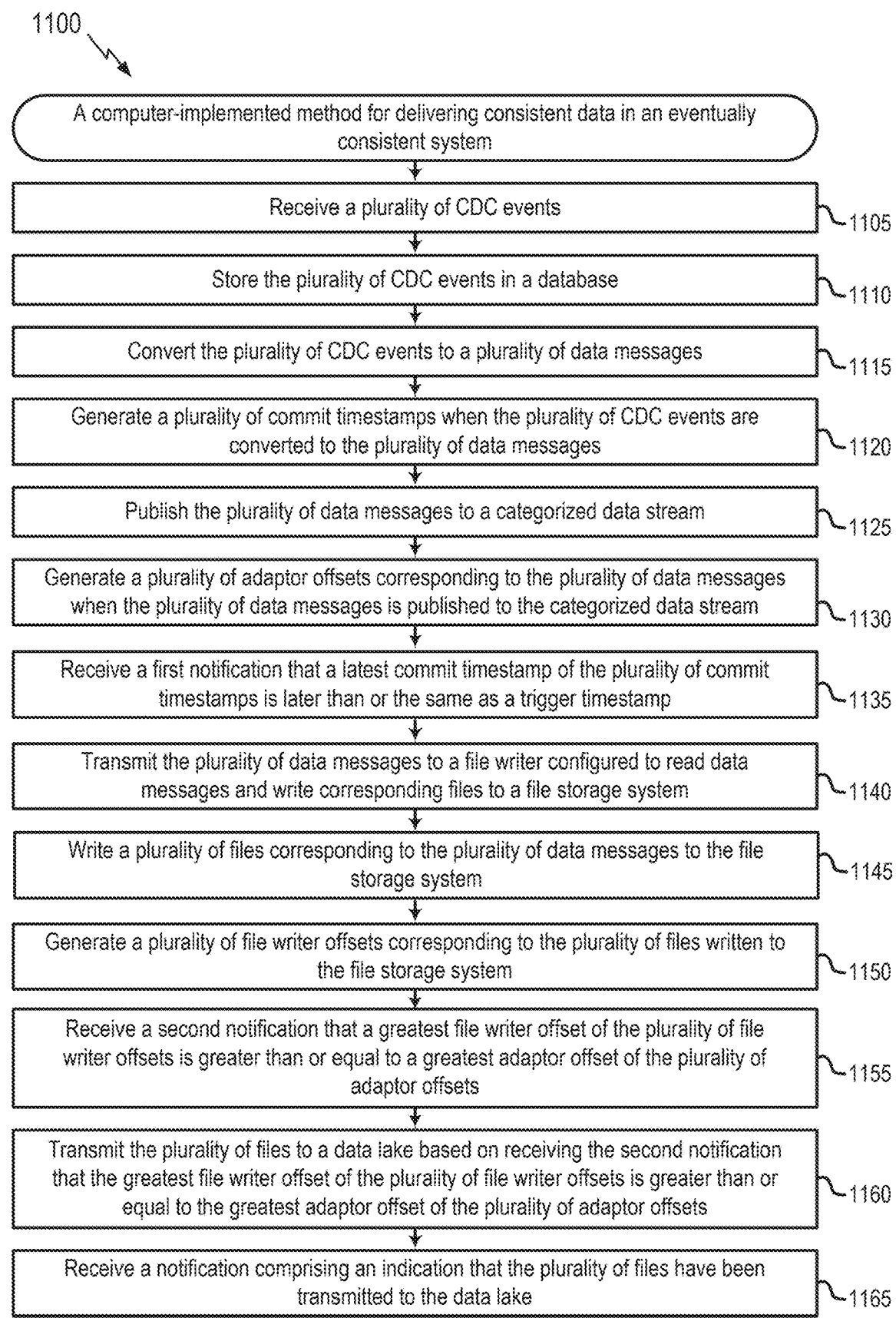

1100

A computer-implemented method for delivering consistent data in an eventually consistent system Receive a plurality of CDC events ~1105

Store the plurality of CDC events in a database ~1110

Convert the plurality of CDC events to a plurality of data messages ~1115

Generate a plurality of commit timestamps when the plurality of CDC events are converted to the plurality of data messages ~1120

Publish the plurality of data messages to a categorized data stream ~1125

Generate a plurality of adaptor offsets corresponding to the plurality of data messages when the plurality of data messages is published to the categorized data stream ~1130

Receive a first notification that a latest commit timestamp of the plurality of commit timestamps is later than or the same as a trigger timestamp ~1135

Transmit the plurality of data messages to a file writer configured to read data messages and write corresponding files to a file storage system ~1140

Write a plurality of files corresponding to the plurality of data messages to the file storage system ~1145

Generate a plurality of file writer offsets corresponding to the plurality of files written to the file storage system ~1150

Receive a second notification that a greatest file writer offset of the plurality of file writer offsets is greater than or equal to a greatest adaptor offset of the plurality of adaptor offsets ~1155

Transmit the plurality of files to a data lake based on receiving the second notification that the greatest file writer offset of the plurality of file writer offsets is greater than or equal to the greatest adaptor offset of the plurality of adaptor offsets ~1160

Receive a notification comprising an indication that the plurality of files have been transmitted to the data lake ~1165

CONSISTENT DATA DELIVERY IN AN EVENTUALLY CONSISTENT SYSTEM

CROSS-REFERENCE TO RELATED APPLICATIONS

This application claims the benefit of and priority to Indian Patent Application number 202541008209, filed on Jan. 31, 2025, the entire contents of which are hereby incorporated by reference.

BACKGROUND

Field

Aspects of the present disclosure relate to universal integration patterns (UIPs) and data delivery.

Description of Related Art

Distributed computing environments are systems where multiple computers or processing components work together across a network to process data from one or more data sources to one or more shared endpoints. In distributed computing environments, Change Data Capture (CDC) systems monitor and record changes to the data sources, enabling downstream systems to maintain synchronized and current representations of the source data across the different components of the distributed system. These systems typically comprise multiple stages: the capture stage, where changes are initially detected and logged; the processing stage, where changes are transformed and validated; and the ingestion stage, where processed changes are applied to target endpoints.

The capture stage involves monitoring source systems for data modifications, including insertions, updates, and deletions associated with the data sources. The processing stage transforms the captured changes into a format suitable for target endpoints, often involving data validation, enrichment, and transformation operations. The ingestion stage involves applying the processed changes to target endpoints in a manner that maintains data consistency and integrity.

A fundamental goal of CDC systems is ensuring that data remains current and accessible throughout all processing stages. Data currency refers to how current the data is at a particular component. The objective is to maintain minimal time lag between when changes occur in source systems and when these changes are reflected in target endpoints. This process requires handling the change order, processing the updates, and managing the processing speeds across components of the system. Data accessibility involves ensuring that systems can reliably retrieve and utilize the data when needed, even during periods of high system load, maintenance operations, or recovery procedures.

While CDC systems work to process and provide data that is not only up-to-date, but also available for use, these systems are not without limitation. For example, CDC systems should account for various factors, including varying processing speeds across different stages, potential system failures, and the need to scale processing capacity in response to fluctuating change volumes. While accounting for such factors, a CDC system may incur significant latency between providing consistent data between data sources and target endpoints, or may not be able to accurately report a current data status of one or more components of the CDC system. Additionally, in some instances, providing a fully up-to-date and always available CDC system in real-time can require too many computational resources, like memory storage and processing bandwidth, to feasibly maintain and keep running.

SUMMARY

Certain aspects provide a method for delivering consistent data in an eventually consistent system. The method includes storing a first data table comprising a trigger timestamp; storing a second data table comprising a commit timestamp and an adaptor offset corresponding to a latest capture change data (CDC) event recorded in a categorized data stream; determining that the commit timestamp is later than or the same as the trigger timestamp; storing a third data table comprising a file writer offset corresponding to a latest data file of a plurality of data files stored in a file storage system; determining that the file writer offset is greater than or equal to the adaptor offset; causing the plurality of data files stored in the file storage system to be transmitted to and stored in a data lake; and generating and transmitting a notification comprising an indication that the data lake is up-to-date as of the trigger timestamp.

Certain aspects provide a computer-implemented method for delivering consistent data in an eventually consistent system. The method includes receiving a plurality of CDC events; storing the plurality of CDC events in a database; converting the plurality of CDC events to a plurality of data messages; generating a plurality of commit timestamps when the plurality of CDC events are converted to the plurality of data messages; publishing the plurality of data messages to a categorized data stream; generating a plurality of adaptor offsets corresponding to the plurality of data messages when the plurality of data messages is published to the categorized data stream; receiving a first notification that a latest commit timestamp of the plurality of commit timestamps is later than or the same as a trigger timestamp; transmitting the plurality of data messages to a file writer configured to read data messages and write corresponding files to a file storage system; writing a plurality of files corresponding to the plurality of data messages to the file storage system; generating a plurality of file writer offsets corresponding to the plurality of files written to the file storage system; receiving a second notification that a greatest file writer offset of the plurality of file writer offsets is greater than or equal to a greatest adaptor offset of the plurality of adaptor offsets; transmitting the plurality of files to a data lake based on receiving the second notification that the greatest file writer offset of the plurality of file writer offsets is greater than or equal to the greatest adaptor offset of the plurality of adaptor offsets; and receiving a notification comprising an indication that the plurality of files have been transmitted to the data lake.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

FIG. 4 depicts an example of a data pipelines table.

FIG. 5 depicts an example of a trigger latest offset table.

FIG. 8 depicts an example of a trigger adaptor snapshot table.

FIG. 10 depicts a method for delivering consistent data in an eventually consistent system from the perspective of a polling and ingesting system.

FIG. 11 depicts a method for delivering consistent data in an eventually consistent system from the perspective of the eventually consistent system.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
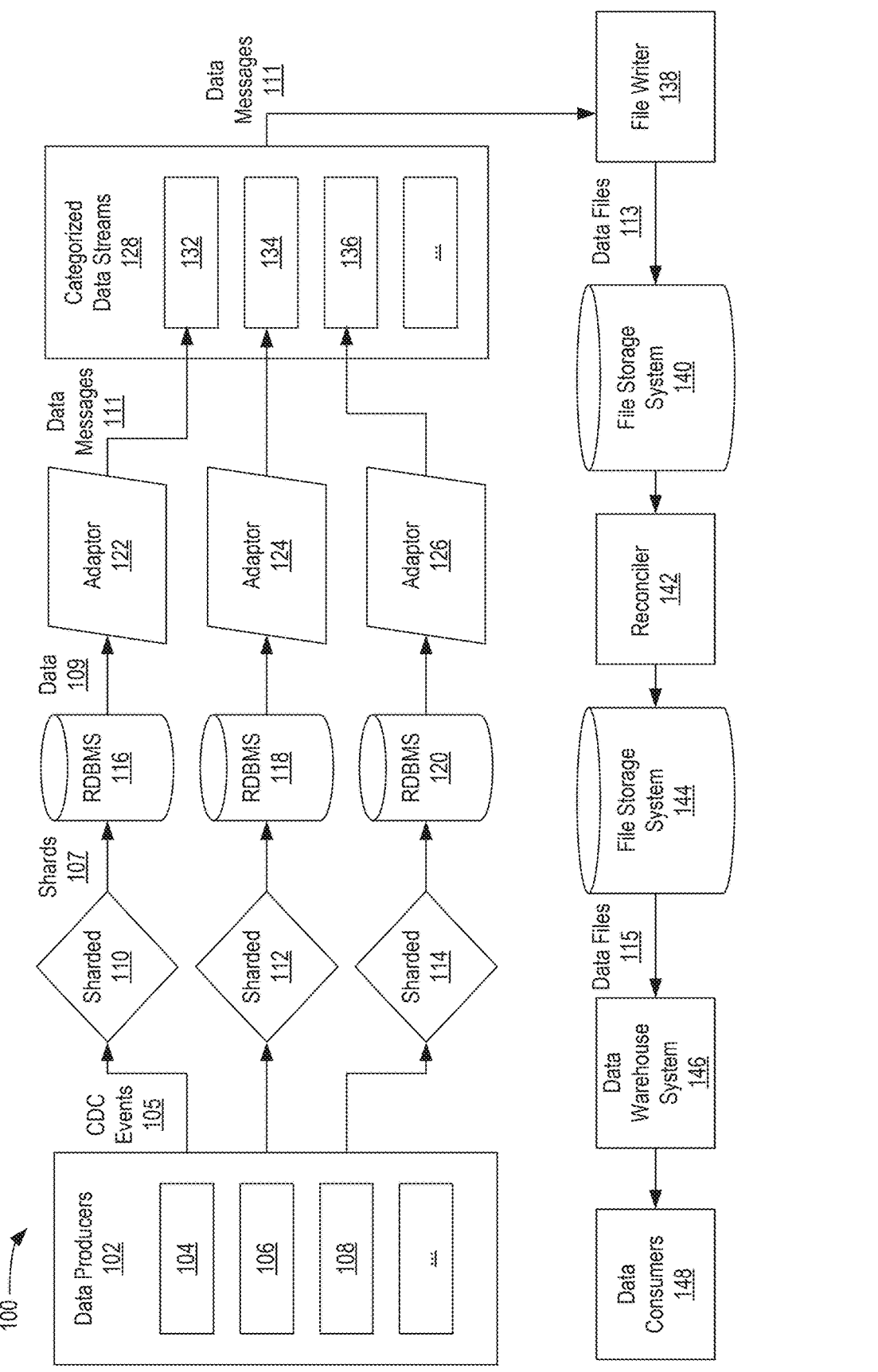
FIG. 1 depicts a process flowchart for ingesting and materializing data from a plurality of data producers to a data warehouse system.

Eventually consistent systems are a type of distributed computing environment in which multiple copies of data, distributed across different nodes that represent individual computing components, converge to a consistent state over time, rather than achieving immediate synchronization between all nodes at once. Thus, such systems viewed holistically are consistent eventually. Eventually consistent systems prioritize two key attributes: high availability and partition tolerance. High availability refers to the system remaining operational and responsive to user requests. Partition tolerance refers to the system's ability to continue functioning when network communications between nodes fail. By accepting temporary inconsistencies between data copies, eventually consistent systems achieve better system scalability, the ability to handle increased workloads, resilience, and the ability to maintain functionality despite failures. Eventually consistent systems are particularly valuable in scenarios where the cost of maintaining strict consistency, or ensuring all nodes have identical data at all times, would significantly impact system performance or availability. This is because eventually consistent systems typically utilize less computational resources over conventional always consistent systems.

In eventually consistent systems, data delivery is the process of transmitting and distributing data from its source to one or more destination systems. When data changes occur at a source system, these modifications propagate through the distributed environment through various replication mechanisms, including direct node-to-node communication, hierarchical distribution that is organized in levels with parent-child relationships, or random communication between nodes to spread updates. During this propagation period, different parts of the system may observe different versions of the data, creating an "inconsistency window," which is the time period during which data inconsistencies exist. During the inconsistency window, the system gradually converges toward a uniform view of the data. The duration of this consistency window can vary based on factors such as communication speed and reliability between nodes, system load (e.g., the amount of work being processed), and the specific consistency protocols governing how updates are propagated.

Within these eventually consistent environments, data processing occurs across multiple distinct stages that collectively ensure reliable data delivery. The capture stage serves as the initial point of contact, where the system first detects and records data changes from source systems. This stage should efficiently identify modifications while minimizing impact on source system performance. The transmission stage then manages the movement of captured changes through the network, implementing routing decisions based on current system conditions and network topology. Subsequent to transmission, the application stage causes changes to be applied to target systems in a manner that preserves data integrity.

However, several significant technical challenges complicate providing up-to-date data through these different stages. For example, varying data change rates can create processing backlogs, where the capture stage receives updates faster than the transmission stage can propagate them. This can lead to increased latency in providing consistent data. Additionally, network partitions between processing stages can interrupt the flow of updates, creating gaps in the change history that must be reconciled when connectivity resumes. Also, scaling the number of nodes introduces exponential complexity in managing data versions and resolving conflicts, as the number of potential interactions between nodes grows significantly with system size.

Administrators of eventually consistent systems have attempted to employ various solutions to maintain data currency and availability. As one example, version management systems can be used track the state of data across all nodes, identifying which nodes have processed which updates. In another example, conflict resolution mechanisms can be used to detect and handle situations where multiple nodes attempt to update the same data simultaneously. To mitigate the variability in data processing speeds at different components, one example solution involves implementing buffer systems that absorb spikes in update volume, allowing processing to continue at a more consistent rate. Another solution utilizes distributed processing frameworks that can dynamically allocate resources based on current processing demands. Some systems employ state reconciliation mechanisms that can detect and resolve inconsistencies that arise during network partitions.

However, these solutions present their own limitations and technical challenges. Buffer systems, while effective at handling variable update rates, can introduce additional latency and complexity in managing buffer capacity. Distributed processing frameworks require additional coordination mechanisms that can become bottlenecks themselves, particularly when processing nodes that need to synchronize their operations. Additionally, state reconciliation mechanisms may require significant computational resources and can introduce additional processing delays during conflict resolution. Furthermore, existing solutions struggle to maintain consistent performance across varying workload patterns and system scales. For example, systems optimized for specific processing patterns or network topologies often perform poorly when conditions deviate from their expected parameters. Ultimately, because of the technical challenges associated with eventually consistent systems and shortcomings of current solutions, it is difficult to determine both if and when an eventually consistent system is up-to-date.

The eventually consistent systems and related methods described herein comprise a plurality of data sources that are updated periodically or continuously by data producers. These updates to the data sources are reported as CDC events, which are then stored in a relational database management system (RDBMS). An RDBMS is a software that organizes and manages collections of structured data in tables with defined relationships. RDBMSs allow for efficient storage, retrieval, and manipulation of data, such as CDC events, through queries. Some example RDMBSs include Postgres™, MySQL™, and Oracle™. CDC events from the RDBMSs are then converted and published as data messages to one or more categorized data streams (like Kafka™ topics), which are used to organize and store related messages in a distributed streaming platform. A categorized data stream is an organized flow of data that is classified into distinct categories based on different attributes of the data being classified. This categorization allows for separation of different types of information, easier processing and routing of data to relevant downstream components, and clear boundaries between different domains, such as different software application services.

The data messages published in the categorized data streams are then converted to data files and stored in a file storage system, such as Amazon™ S3. To make the data files stored in the file storage system more accessible to one or more data consumers, the data files are transmitted to a data lake. A data lake is a centralized data component that stores large amounts of raw, unstructured, and structured data until it is needed for further analysis. Data lakes provide consolidation from multiple file locations within the file storage system, often provide more cost-effective long term storage than file storage systems, and offer improved querying and analysis capabilities over file storage systems. In some aspects, a data warehouse software (like Apache™ Hive) can be applied to the data lake to enable reading, writing, and managing of large datasets. The data warehouse software usually provides a query engine and metadata layer, wherein data consumers can structure and analyze raw data through efficient query syntax while maintaining data in its original format.

In aspects described herein, the CDC events are converted to data messages formatted for publishing to categorized data streams by one or more adaptors that are configured to identify, process, and convert CDC events to correctly formatted data messages. When the adaptor reads the CDC event, a commit timestamp is recorded by the adaptor. However, this commit timestamp is not stored as part of the data message when it is published to the categorized data stream. Instead, when the data message is published, it is assigned an adaptor offset, which is a numerical identifier that is stored as part of the data message. The adaptor offset is configured as a non-negative integer that increments with each new data message that is published to the categorized data stream. Similarly, when the data messages are converted to data files by a file writer, the data files are assigned a file writer offset, which is also configured as a non-negative integer that increments with each new data files that is stored in the file storage system. In some aspects, the file writer utilizes the same number identifier for the data file that the adaptor assigned to the corresponding data message. The adaptor offsets and file writer offsets are configured as position markers that indicate where a data message or data file is located within the plurality of data messages or data files. Thus, the offsets enable message tracking and ordering and supports transmission of data in the correct sequence to the next downstream component.

Because certain metadata (like the commit timestamps) are not propagated through each component of the eventually consistent system, it is difficult to track which components are up-to-date. Accordingly, the present disclosure provides systems and methods that track and correlate metadata of the components and their corresponding data to enable a data consumer to understand whether the system is up-to-date and up to what time the system is up-to-date.

In some aspects, a set of data tables are generated and updated with relevant metadata that can be quickly and efficiently queried by a polling system. In one example, a first data table comprises trigger timestamps that have been received as part of system status requests from data consumers. The trigger timestamp indicates up to what time the data consumer would like to know if the data lake is up-to-date. A second data table comprises commit timestamps corresponding to when CDC events are read by the adaptors. The polling system is able to query the second data table and determine if a latest commit timestamp is later than or the same as the trigger timestamp. If the latest commit timestamp is later than or the same as the trigger timestamp, it means that the RDBMS and the adaptors are up to date with the latest CDC events because the last CDC event read by the adaptor is up to date, as of the trigger timestamp, with the latest changes occurring at the data sources. If the latest commit timestamp is earlier than the trigger timestamp, it may mean either 1) that the RDBMS and/or the adaptors are not up-to-date or 2) that no additional changes occurred at the data sources after the time corresponding to the latest commit timestamp. If no additional changes occurred after the latest commit timestamp, then RDMBS and the adaptors are up-to-date.

The second data table also comprises adaptor offsets corresponding to when the CDC events are converted to data messages and published to the categorized data streams. A third data table comprises file writer offsets corresponding to when data messages published to the categorized data streams. The polling system can then query the second data table and third data table to determine if the latest file writer offset in the third data table is greater than or equal to the latest adaptor offset in the second data table. Additionally, if the latest file writer offset is less than the latest adaptor offset, it may mean either that the file storage system is not up-to-date as of the trigger timestamp.

If the latest file writer offset is greater than or equal to the latest adaptor offset, then the file storage system is up-to-date because it means that the latest data file that was stored in the file storage system corresponds to the latest data message published to the categorized data stream. Because the polling system can correlate the latest file writer offset as corresponding to the latest adaptor offset, the polling system can then identify the commit timestamp corresponding to that adaptor offset. Based on identifying the commit timestamp, the polling system can determine up to what time the file storage system is up-to-date.

Once the file storage system is determined to be up-to-date as of the trigger timestamp, the data files in the file storage system can be materialized into a data lake that is accessible to the data consumer. The data consumer can then access the data in the data lake with confidence knowing that the data lake is up-to-date as of the trigger timestamp. Alternatively, the data consumer can know that the data in the data lake is not up-to-date and either wait until it is or, alternatively, know what time (different than the trigger timestamp) the data lake is up-to-date.

Systems and methods described herein thus achieve many technical benefits over conventional systems and methods associated with data delivery in eventually consistent systems. In particular, the systems and methods described herein provide a way to determine if and when the system is up-to-date by providing a way to track and correlate metadata that is produced in different formats. For example, the present disclosure provides for tracking and comparing commit timestamps against trigger timestamps and tracking and comparing file writer offsets against adaptor offsets to determine if the latest data recorded in a downstream component corresponds to the latest data recorded in a preceding component of the eventually consistent system.

Furthermore, systems and methods herein provide a way to determine not only if the target endpoint component is up-to-date, but also track intermediary components of the eventually consistent system as well. This is achieved because metadata is recorded at multiple components, such as at the adaptors, the categorized data streams, the file writer, and the file storage system. As an additional technical improvement over conventional systems, aspects described herein provide a way to communicate to data consumers the status of the eventually consistent system within a reduced time interval (e.g., 2 hours) of the requested status update. Conventional systems and methods usually incur a delay of approximately 24 hours of the requested status update. Additionally, systems and methods described herein utilize limited additional computational resources, such as processing and memory storage, because the metadata stored in the various data tables comprise minimal data sizes for storage and are easily and efficiently queried with minimal processing power.

Example Eventually Consistent System

FIG. 1 depicts a process flowchart for ingesting and materializing data from a plurality of data producers to a data warehouse system as part of an eventually consistent system 100. FIG. 1 depicts a plurality of data producers 102 comprising data producer 104, data producer 106, and data producer 108. While FIG. 1 depicts only three data producers, it should be appreciated that any number of data producers may be integrated into the process associated with FIG. 1.

A data producer is a user or upstream application or service that uses and interacts with one or more software applications. In some instances, each data producer corresponds to a different software application within a plurality of related services or a different functionality within the same software application. For example, data producer 104 may correspond to a business accounting software application, data producer 106 may correspond to a banking and finances tracking application, and data producer 108 may correspond to personal or self-employed accounting software. When the data producers 102 interact with the different software applications, new data is produced and captured.

The new data is captured as CDC events 105 that are sharded. Sharding refers to a database architecture pattern where data is split into smaller, more manageable database pieces called shards. In some instances, these shards are stored across multiple machines or servers. For example, CDC events 105 received from data producer 104 are sharded 110 into shards 107 and stored in RDBMS 116. Similarly, data received from data producer 106 is sharded 112 and stored in RDBMS 118, and data received from data producer 108 is sharded 114 and stored in RDBMS 120.

Next, data 109 is transmitted to adaptor 122 that is configured to read data 109 and convert data 109 to data messages 111. Adaptor 122 is a software component that acts as a bridge between a relational database and a software service that facilitates the publishing of data messages to different categorized data streams 128. Adaptor 122 monitors RDBMS 116 for changes, such as inserted data, updated data, or deleted data by reading the database's transaction logs. Changes can be captured in real-time. Adaptor 122 then converts the database changes (e.g., data 109) into a format that is suitable for the categorized data streams 128, such as data messages 111. After converting the data type of data 109 to data messages 111, Adaptor 122 publishes data messages 111 to one or more categorized data streams 128. For example, data messages 111 from adaptor 122 are published to categorized data stream 132, data messages from adaptor 124 are published to categorized data stream 134, and data messages from adaptor 126 are published to categorized data streams 136. Notably, adaptor 122 maintains the ordering of events represented by data 109 and data messages 111.

Adaptor 122 records a commit timestamp for each data event of data 109 that the adaptor 122 reads and converts to a corresponding data message. The commit timestamp is the date and time that the adaptor reads a specific data event. In certain configurations of eventually consistent systems, depending on the software services that facilitate the usage of one or more components of the eventually consistent system, a limitation in tracking data system may be incurred. For example, in some instances, when the corresponding data message is published to the categorized data stream 128, the data message is assigned and published with an adaptor offset, but omits the commit timestamp. An adaptor offset is a sequential number identifier associated with each data message that is published to the categorized data streams 128. Subsequent data messages are assigned adaptor offsets that are incremented by a certain amount (e.g., by one integer number). Because the commit timestamp is omitted when the data message is published to a categorized data stream, the commit timestamp is not propagated to further downstream components, making tracking the data processing flow difficult when trying to determine if the system is up-to-date as of a certain time.

Next, data messages 111 published to categorized data streams 128 are consumed by file writer 138, which writes the data messages as data files in file storage system 140. In some aspects, file writer 138 retains the adaptor offsets as the file writer offsets so that the file writer offsets comprise the same integer number as the corresponding adaptor offset. In this manner, data messages and their corresponding data files can be easily tracked and identified without having to undergo an additional tracking identifier conversion. In addition to writing data files to the file storage system, file writer 138 may also be configured to perform error handling, monitoring, and recovery to ensure reliable data delivery from the categorized data stream 128 to file storage system 140. File storage system 140 may include a plurality of different storage buckets, wherein data files 113 can be written into different storage buckets based on a category associated with the respective data file. For example, data messages from a particular categorized data stream may be written to the same bucket in the file storage system. In some instances, a particular categorized data comprises data messages associated with a personal finance tracking software. Those data messages would then be converted to data files which would be stored in the same bucket associated with the personal finance tracking software.

In some instances, reconciler 142 is used to ensure data consistency between the source and target systems (e.g., between the RDBMS and the file storage system). Reconciler 142 is configured to periodically scan both data storages, compare the records, and identify missing, duplicate, or mismatched records so that these errors in data consistency can be monitored and corrected. After the data is reconciled, data files 115 from reconciled file storage system 144 are transmitted to a data warehouse system 146 that is accessible to data consumers 148. A data consumer is a user or downstream application that accesses and utilizes data stored in the data warehouse system 146. Data warehouse system 146 is configured to organize data into databases, tables, and partitions to support data querying by the data consumers 148.

Notably, the system illustrated in FIG. 1 is an eventually consistent system because the steps from recording CDC events to writing the corresponding files in the file storage system 144 create a latency before the file storage system 144 is up-to-date with all of the CDC events recorded in the RDBMS. Further aspects described herein provide solutions for determining whether and up to what time different components of the eventually consistent system are up-to-date.

Overview of Data Polling and Ingesting System

Figure 2:
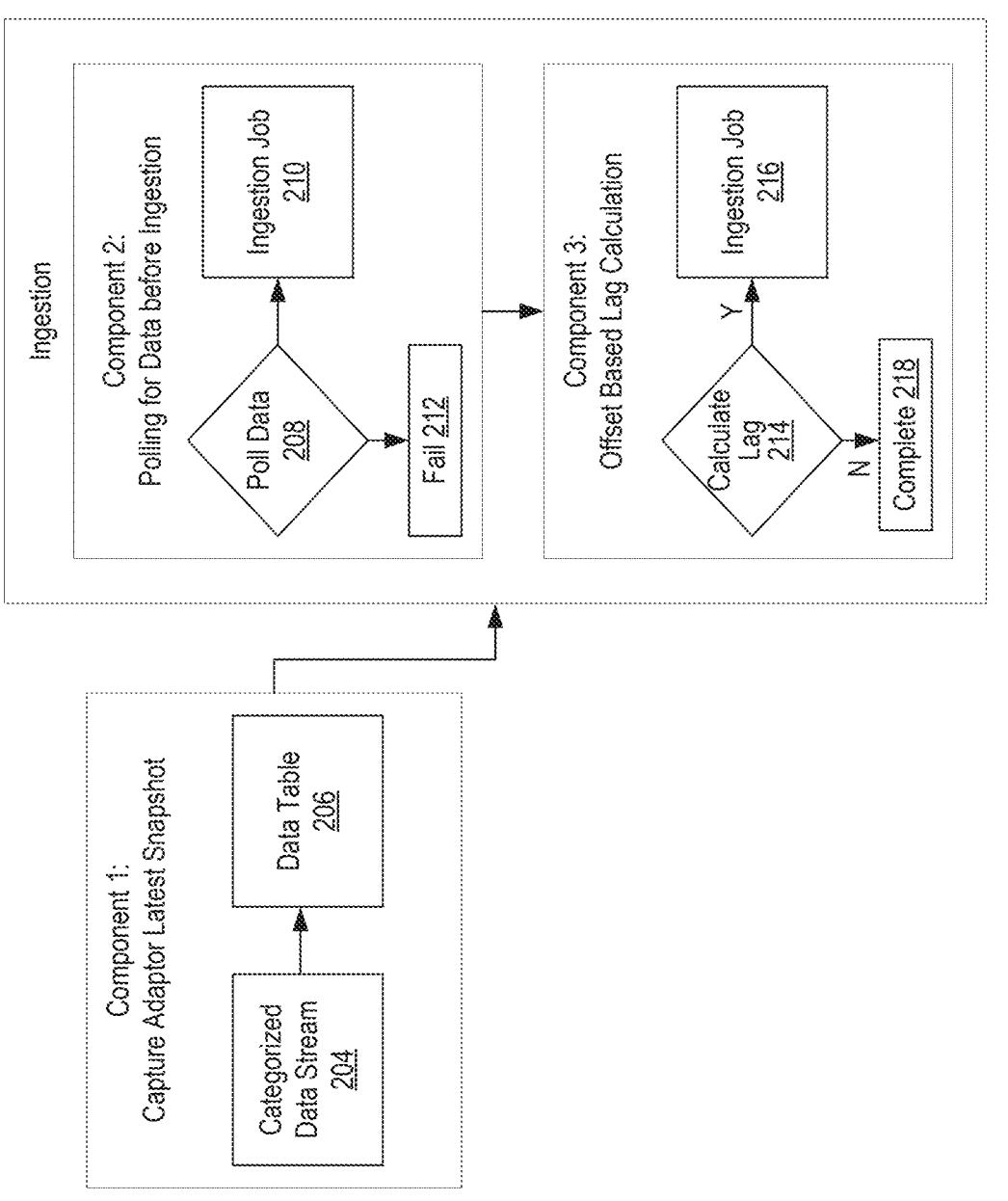
FIG. 2 depicts a flowchart diagram of a system for determining data freshness of a data lake.

FIG. 2 depicts a flowchart diagram of a polling and ingesting system for determining whether and up to what time an eventually consistent system is up-to-date.

In particular, FIG. 2 depicts a plurality of components (e.g., component 1, component 2, and component 3) to facilitate the tracking and reporting of the status of the different components of the eventually consistent system. Component 1 is configured to monitor the categorized data stream 204 and generate a data table 206 that captures metadata about the adaptors and categorized data streams. Component 1 is described in more detail with reference to FIGS. 3-5. Component 2 is configured to poll data from one or more data tables before ingesting data into the data lake. For example, component 2 polls data at poll data 208 to determine whether the data is up-to-date at different stages of the data processing. If the data is not up-to-date, the polling action at poll data 208 returns fail 212 and waits before ingesting data to a data lake. If poll data 208 returns a true state (meaning the data is up-to-date), the true state triggers an ingestion job 210 to transmit data from the file storage system, which has been determined to be up-to-date, to a data lake accessible to a data consumer who requested the system status update. Notably, data files from file storage system are transmitted to the data lake after file storage system has been determined to be up-to-date. Component 2 is described in more detail with reference to FIGS. 6-8

In some instances, not all of the data from the file storage system can be ingested and transmitted from the file storage system to the data lake in a single batch. In that case, the data will need to be ingested and transmitted in batches. Accordingly, component 3 is configured to calculate an offset-based log calculation to determine if another ingestion job 216 is needed or if the data in the data lake is up-to-date, meaning that ingestion job 210 was complete 218 and ingested the necessary data to cause the data lake to be up-to-date. Component 3 is described in more detail with respect to FIG. 9. Typically, the system is configured to ensure that the data lake is up-to-date up to a particular time (e.g., a trigger timestamp) submitted by a data consumer. For example, the data consumer make a request at 2:00 PM to know if the system is up-to-date as of 2:00 PM today. The trigger timestamp is recorded as 2:00 PM. In some aspects, the system will deliver a notification by 4:00 PM to the data consumer that the system is up-to-date up to 2:00 PM, providing a short turn-around time on the system status update. If the system is not up-to-date, the notification will indicate that the system is not up-to-date as of 2:00 PM. In some instances, the notification will provide a time that the system is up-to-date, such as 12:00 PM.

Data Polling and Ingesting: Component 1

Figure 3:
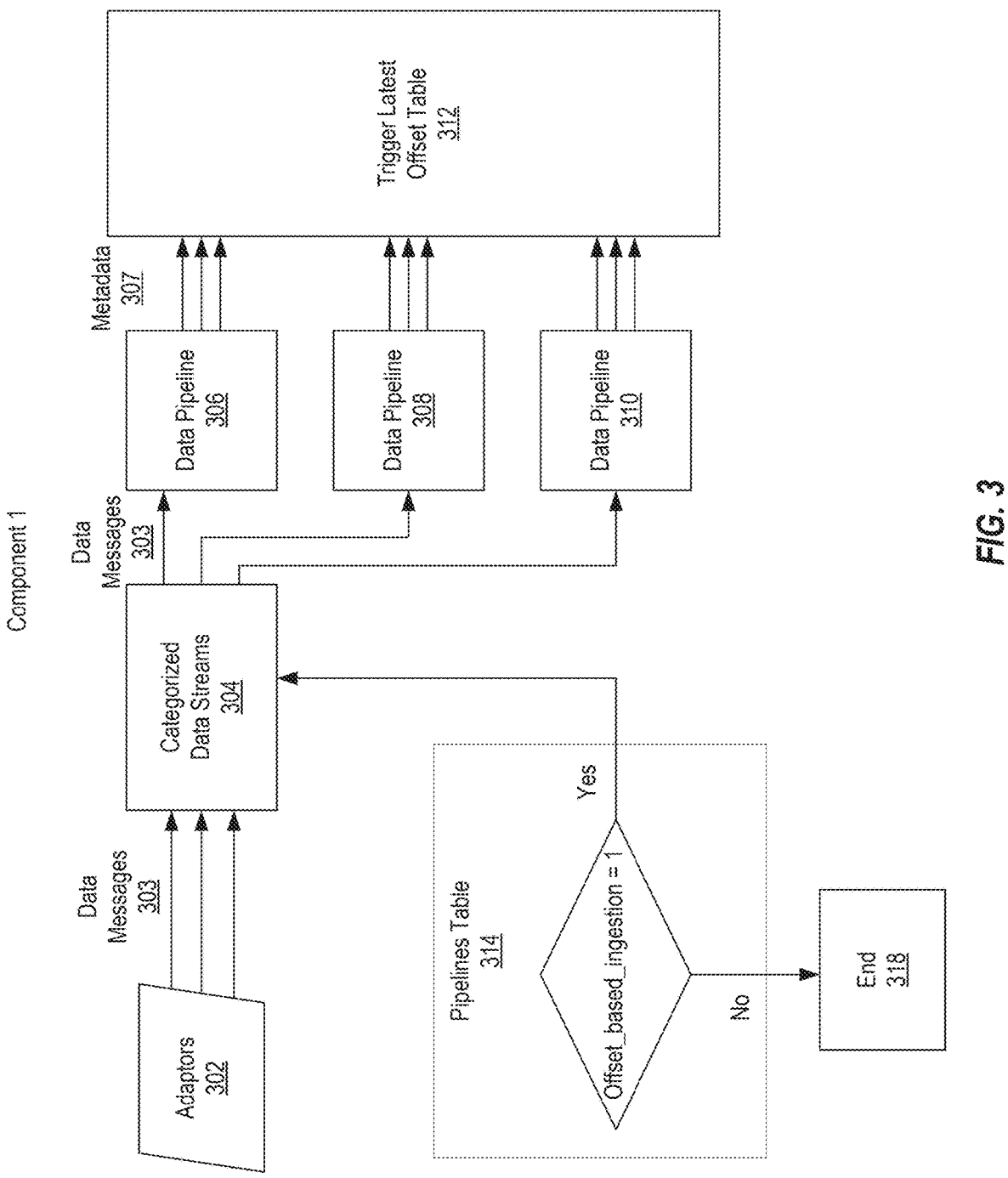
FIG. 3 depicts a process flowchart for capturing data from a plurality of data pipelines.

FIG. 3 depicts a process flowchart for capturing and recording data from a plurality of data pipelines (e.g., Component 1 of FIG. 2). Some components of FIG. 3 are described with reference to FIG. 1. FIG. 3 depicts part of the data processing system illustrated in FIG. 1, along with additional components and functionality that allow for determining if and up until what time the data processing is up-to-date.

In particular, FIG. 3 depicts adaptors 302 (e.g., adaptor 122, adaptor 124, etc. in FIG. 1) reading and converting CDC events (not illustrated) to data messages 303 (e.g., data messages 111 in FIG. 1). Adaptors 302 publish data messages 303 to categorized data streams 304 (e.g., categorized data streams 128 in FIG. 1).

As mentioned in the description of FIG. 1, commit timestamps are generated for CDC events when they are read by adaptors 302, and adaptor offsets are assigned to and recorded in the data messages 303 when they are published to categorized data streams 304. The categorized data streams 304 correspond to a plurality of different data pipelines (e.g., data pipeline 306, data pipeline 308, and data pipeline 310). A data pipeline is an automated system that moves data from a source destination (e.g., a relational database) to a target destination (e.g., a data lake) and may perform data transformations and validations along the way. Metadata 307 about the data pipelines, such as commit timestamps, adaptor offsets, and file writer offsets, are recorded in a trigger latest offset table 312, which is described in more detail with reference to FIG. 5.

Data Pipelines Table

FIG. 3 also depicts data pipelines table 314. Data pipelines table 314 is used to determine information about the offset-based ingestion. If the offset-based ingestion is true (e.g., returns 1), then the data pipelines table 314 is updated with more metadata from categorized data streams 304. If the offset-based ingestions is false (e.g., returns 0), then the process ends (e.g., end 318). An example of a data pipelines table 314 is illustrated in FIG. 4.

In particular, FIG. 4 depicts an example of a data pipelines table. In this example, data pipelines table 402 comprises metadata about the different data pipelines of the eventually consistent system. Data pipelines table 402 can be updated at any time during the data processing of data through one or more data pipelines. Metadata that is recorded in the data pipelines table includes a group name, a table full name, a pipeline name, and a latest commit timestamp. The group name refers to the group name of the data, which in some instances, is related to the topic name of the categorized data stream. The table full name refers to the name of the table from which the metadata is gathered. The pipeline name is also related to the topic name of the categorized data stream.

The latest commit timestamp is the commit timestamp corresponding to the latest CDC event read by the adaptor corresponding to the particular data pipeline.

Trigger Latest Offset Table

FIG. 5 depicts an example of a trigger latest offset table 502. In particular trigger latest offset table 502 comprises metadata about the processing starting with receiving data from data consumers and ending with transmitting data to a data lake. Trigger latest offset table 502 can be updated at any time during the data processing, including when a new file is written to the file storage system by a file writer (e.g., file writer 138 of FIG. 1). Metadata categories include, for example, the field, the data type, whether it is a null value, a key, the default value, and extra information. The fields in trigger latest offset table 502 include a group name, a table full name, a latest offset, a latest commit timestamp, a file writer offset, and the latest update date. The group name refers to the group name of the data, which in some instances, is related to the topic name of the categorized data stream. The group name is configured as a variable character data type. The table full name refers to the name of the table from which the metadata is gathered. The table full name also is configured as a variable character data type.

The latest offset is the last recorded adaptor offset for the latest data message that was published to a categorized data stream. The latest offset is configured as an integer data type in this example. The latest commit timestamp is the commit timestamp corresponding to the latest CDC event read by the adaptor. The latest commit timestamp is configured as a timestamp data type. The file writer offset is the file writer offset corresponding to the latest data message written by the file writer to the file storage system. The file writer offset is configured as an integer data type in this example. The latest update date is the timestamp of the latest date and time that the trigger latest offset table was updated and is configured as a timestamp data type. The trigger latest offset table 502 can be polled to determine if and/or up to what time a data lake corresponding to a data pipeline is up-to-date. This polling process is described in more detail with reference to FIG. 6 below.

Data Polling and Ingesting: Component 2

Figure 6:
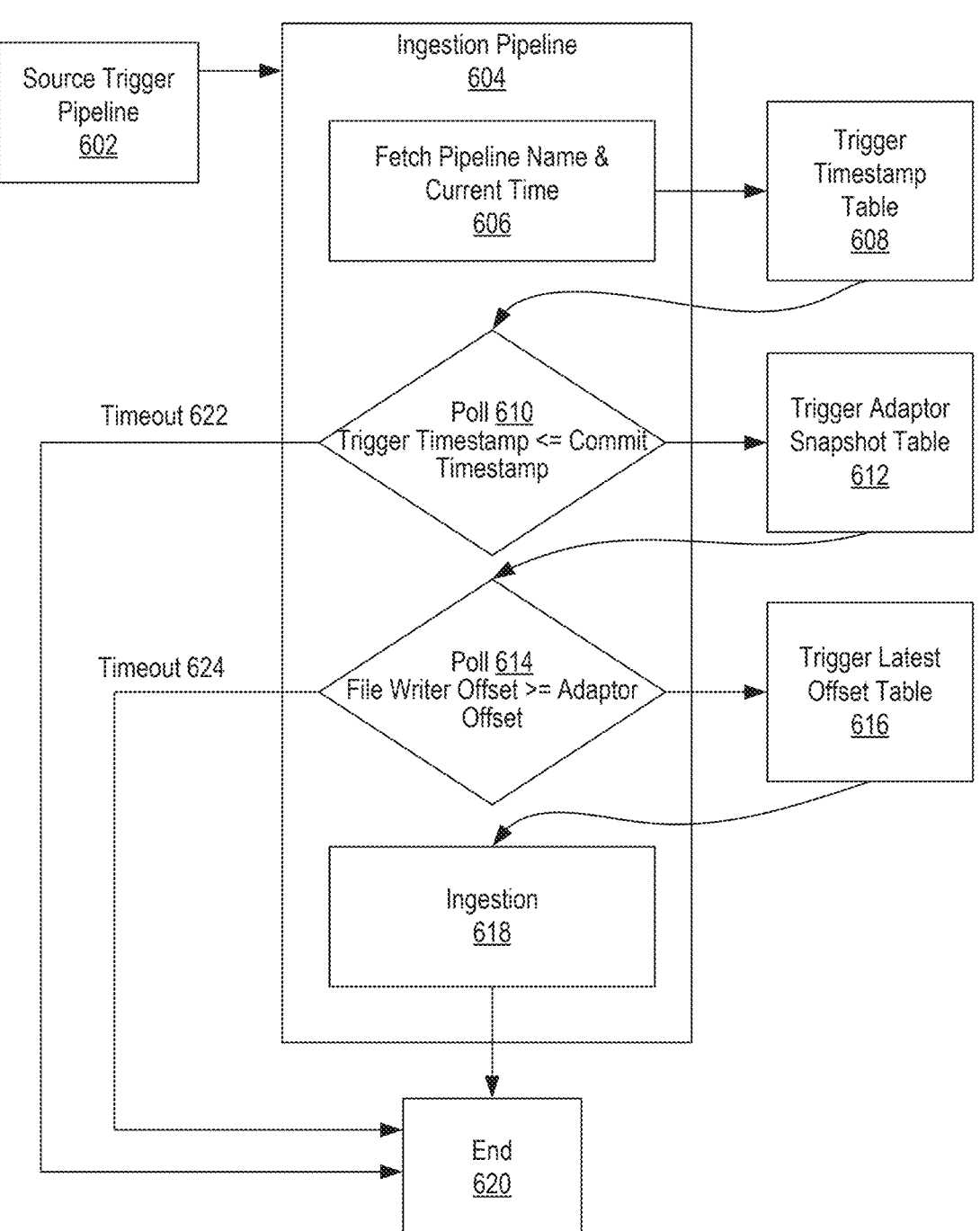
FIG. 6 depicts a process flowchart for ingesting and polling data.

FIG. 6 depicts a process flowchart for ingesting and polling data (e.g., Component 2 of FIG. 2).

In particular, FIG. 6 depicts an ingestion pipeline 604 that comprises a plurality of steps that are taken to monitor and analyze different stages of source trigger pipeline 602 (e.g., pipeline 306 of FIG. 3). Ingestion pipeline 604 is triggered when a data consumer submits a request to determine if the data lake is up-to-date, which in some cases means up to date as of a certain time or time offset (e.g., up to date as of a certain number of minutes or hours ago). This time is referred to as the trigger timestamp and is recorded in trigger timestamp table 608. Trigger timestamp table 608 is described in more detail with reference to FIG. 7, which illustrates an example of a trigger timestamp table.

Ingestion pipeline 604 fetches the pipeline name and a current time at 606.

Next, ingestion pipeline 604 performs a poll 610 of the data recorded in the trigger adaptor snapshot table 612 to determine if a commit timestamp of a latest CDC event read by the adaptor is later than or at least the same time as the trigger timestamp submitted by the data consumer. Trigger adaptor snapshot table 612 is described in more detail with reference to FIG. 8.

Next, ingestion pipeline 604 performs a poll 614 of the data recorded in the trigger latest offset table 616 (e.g., trigger latest offset table 502 of FIG. 5) to determine if a file writer offset assigned to a latest file written to the file storage system is greater than or equal to the adaptor offset of a latest data message published to the categorized data stream. If (1) the commit timestamp is later than or at least the same time as the trigger timestamp and (2) the file writer offset is greater than or equal to the adaptor offset, then the files stored in the file storage system are ingested (e.g., at 618) and transmitted to the data lake. Ingestion at 618 is described in further detail with reference to FIG. 9. Once ingestion at 618 is completed, the ingestion pipeline 604 ends at 620.

If, during the first poll at 610, the commit timestamp is determined to be earlier than the trigger timestamp, then ingestion pipeline 604 waits a timeout period (e.g., timeout period 622). Timeout period 622 is a certain amount of time that must pass while monitoring the adaptors before the ingestion pipeline 604 can determine if the source trigger pipeline is up-to-date or not. After waiting the timeout period, if the trigger adaptor snapshot table 612 is not updated with any new metadata, ingestion pipeline 604 ends its processes at 620. In this case, the source trigger pipeline is considered to be up-to-date up to the trigger timestamp because no new data has been processed during the timeout period 622.

If the commit timestamp is determined to be later than or at least the same time as the trigger timestamp at poll 610, but the file writer offset is less than the adaptor offset at poll 614, then the ingestion pipeline 604 waits a timeout period (e.g., timeout period 624). Time out period 624 is a certain amount of time that must pass before the ingestion pipeline 604 determines if the source trigger pipeline is up-to-date or not based on monitoring the categorized data stream corresponding to the source trigger pipeline and the file storage system. After waiting the time out period 624, if the trigger latest offset table 616 is not updated with new metadata, then ingestion pipeline 604 can determine that the source trigger pipeline is up-to-date up until the trigger timestamp.

Trigger Timestamp Table

Figure 7:
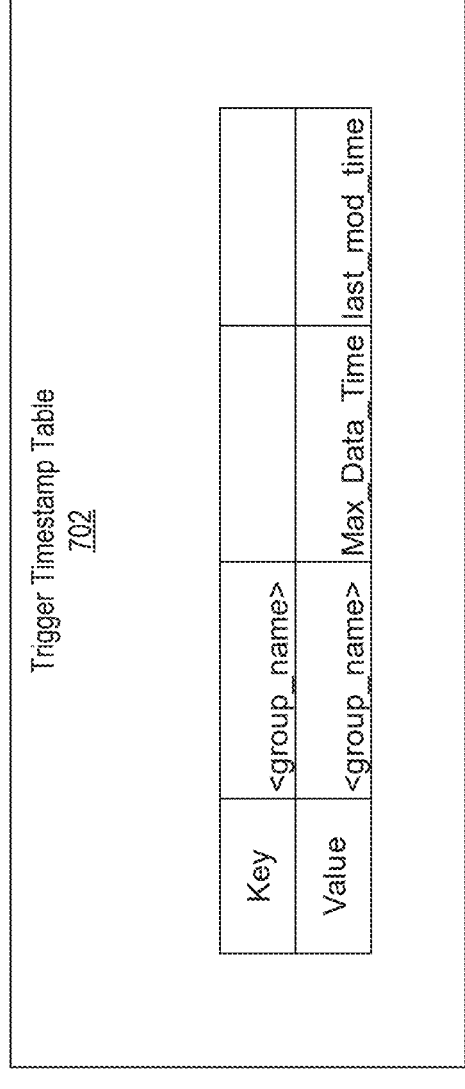
FIG. 7 depicts an example of a trigger timestamp table.

FIG. 7 depicts an example of a trigger timestamp table 702, which is a data table that records the trigger timestamps and corresponding metadata. Trigger timestamp table 702 records the group name of the corresponding source trigger pipeline and groups the values for each group together. For example, trigger timestamp table 702 records the group name, the max data time, and the last modified time in this example. The max data time is another name for the trigger timestamp, which is the time that a data consumer has requested to know if the data lake is up-to-date. The last modified time is the current time that the trigger timestamp table 702 was updated (e.g., the current time that the trigger timestamp was received and recorded).

Trigger Adaptor Snapshot Table

FIG. 8 depicts an example of a trigger adaptor snapshot table 802. In this example, trigger adaptor snapshot table 802 comprises metadata about processing that happens from receiving data from data consumers to transmitting data to a data lake. Trigger adaptor snapshot table 802 can be updated at any time during the data processing, including when a new CDC event is read by an adaptor. Because of this, trigger adaptor snapshot table 802 represents a "snapshot" in time of the latest activity of an adaptor. Metadata that is recorded in the trigger adaptor snapshot table 802 includes a group name, a table full name, a latest offset, a latest commit timestamp, and the latest update date in this example. The group name refers to the group name of the data, which in some instances, is related to the topic name of the categorized data stream. The table full name refers to the name of the table from which the metadata is gathered.

The latest offset is the last recorded adaptor offset for the latest data message that was published to a categorized data stream. The latest commit timestamp is the commit timestamp corresponding to the latest CDC event read by the adaptor. The latest update date is the timestamp of the latest date and time that the trigger adaptor snapshot table 802 was updated.

Data Polling and Ingesting: Component 3

Figure 9:
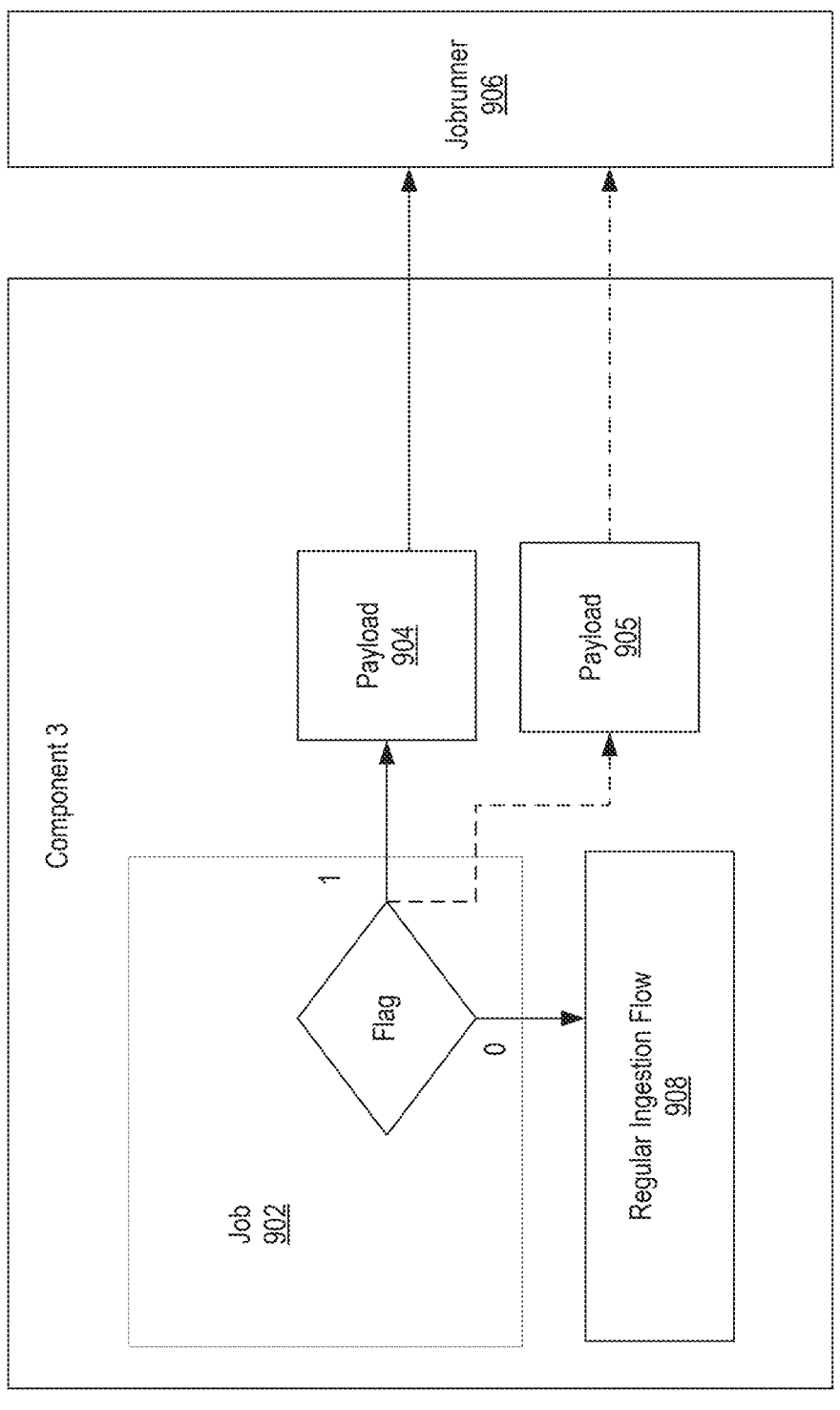
FIG. 9 depicts a process flowchart for materializing data into a data lake in batches.

FIG. 9 depicts a process flowchart for materializing data into a data lake in batches (e.g., Component 3 of FIG. 2).

In particular, FIG. 9 depicts job 902, which in this example is an ingestion job associated with ingesting data from data files stored in the file storage system and transmitting the data to a data lake. In some instances, job 902 is performed by a materializer that is configured to extract, transform, and write data from the file storage system to the data lake. In such instances, the materializer may be associated with a maximum data quantity that it can transmit in one ingestion job. This limitation of the materializer means that data may need to be transmitted in batches if the quantity of data associated with the data files from the file storage system is greater than what the materializer is able to transmit in one batch. Accordingly, job 902 is analyzed to determine if a data quantity associated with job 902 is greater than or equal to the maximum data quantity of the materializer. If job 902 contains less than the maximum data quantity, then the regular ingestion flow 908 is performed (e.g., in one batch). In contrast, if job 902 contains more than the maximum data quantity, then multiple payloads (e.g., payload 904, payload 905) that comprise a quantity of data less than or equal to the maximum data quantity are sent to the jobrunner 906. Jobrunner 906 is configured to cause the materializer to transmit each payload (e.g., payload 904 and payload 905) of job 902 in series until all of the data in job 902 is transmitted to the data lake.

EXAMPLE Method for Delivering Consistent Data Using a Polling and Ingesting System FIG. 10 depicts an example method 1000 for delivering consistent data in an eventually consistent system from the perspective of a polling and ingesting system. In one aspect, method 1000 can be implemented by the processing system 1200 of FIG. 12.

Method 1000 begins at block 1005 with storing a first data table comprising a trigger timestamp. In some aspects, block 1005 is performed by storing component 1238 of FIG. 12. For example, storing component 1238 may be configured to store trigger timestamp table 608 of FIG. 6 comprising one or more trigger timestamps received from source trigger pipeline 602. By storing trigger timestamps, method 1000 is able to keep track of incoming system status requests by different data consumers who are requesting to know if their data lake is up-to-date.

Method 1000 then proceeds to block 1010 with storing a second data table comprising a commit timestamp and an adaptor offset corresponding to a latest CDC event recorded in a categorized data stream. In some aspects, block 1010 is performed by storing component 1238 of FIG. 12. For example, storing component 1238 may be configured to store trigger adaptor snapshot table 612 of FIG. 6 comprising one or more commit timestamps and one or more adaptor offsets. By storing commit timestamps, method 1000 is able to compare the commit timestamps with the trigger timestamps quickly and efficiently.

Method 1000 then proceeds to block 1015 with determining that the commit timestamp is later than or the same as the trigger timestamp. In some aspects, block 1015 is performed by determining component 1214 of FIG. 12. For example, determining component 1214 may be configured to perform poll 610 of FIG. 6 which determines whether the commit timestamp is later than or the same time as the trigger timestamp. If the latest commit timestamp is later than or the same as the trigger timestamp, method 1000 is able to determine whether the RDBMS and the adaptors are up to date with the latest CDC events because the last CDC event read by the adaptor is up to date, as of the trigger timestamp, with the latest changes occurring at the data sources.

Method 1000 then proceeds to block 1020 with storing a third data table comprising a file writer offset corresponding to a latest data file of a plurality of data files stored in a file storage system. In some aspects, block 1020 is performed by storing component 1238 of FIG. 12. For example, storing component 1238 may be configured to store trigger latest offset table 616 of FIG. 6 comprising one or more file writer offsets.

Method 1000 then proceeds to block 1025 with determining that the file writer offset is greater than or equal to the adaptor offset. In some aspects, block 1025 is performed by determining component 1214 of FIG. 12. For example, determining component 1214 may be configured to perform poll 614 of FIG. 6 which determines whether the latest file writer offset is greater than or equal to the latest adaptor offset.

If the latest file writer offset is greater than or equal to the latest adaptor offset, then the file storage system is up-to-date because it means that the latest data file that was stored in the file storage system corresponds to the latest data message published to the categorized data stream. Because the polling system can correlate the latest file writer offset as corresponding to the latest adaptor offset, the polling system can then identify the commit timestamp corresponding to that adaptor offset. Based on identifying the commit timestamp, the polling system can determine up to what time the file storage system is up-to-date.

Method 1000 then proceeds to block 1030 with causing the plurality of data files stored in the file storage system to be transmitted to and stored in a data lake. In some aspects, block 1030 is performed by causing component 1218 of FIG. 12. For example, causing component 1218 may be configured to cause ingestion 618 of FIG. 6. Once the file storage system is determined to be up-to-date as of the trigger timestamp, the data files in the file storage system can be materialized into a data lake that is accessible to the data consumer. The data consumer can then access the data in the data lake with confidence knowing that the data lake is up-to-date as of the trigger timestamp.

Method 1000 then proceeds to block 1035 with generating and transmitting a notification comprising an indication that the data lake is up-to-date as of the trigger timestamp.

Figure 12:
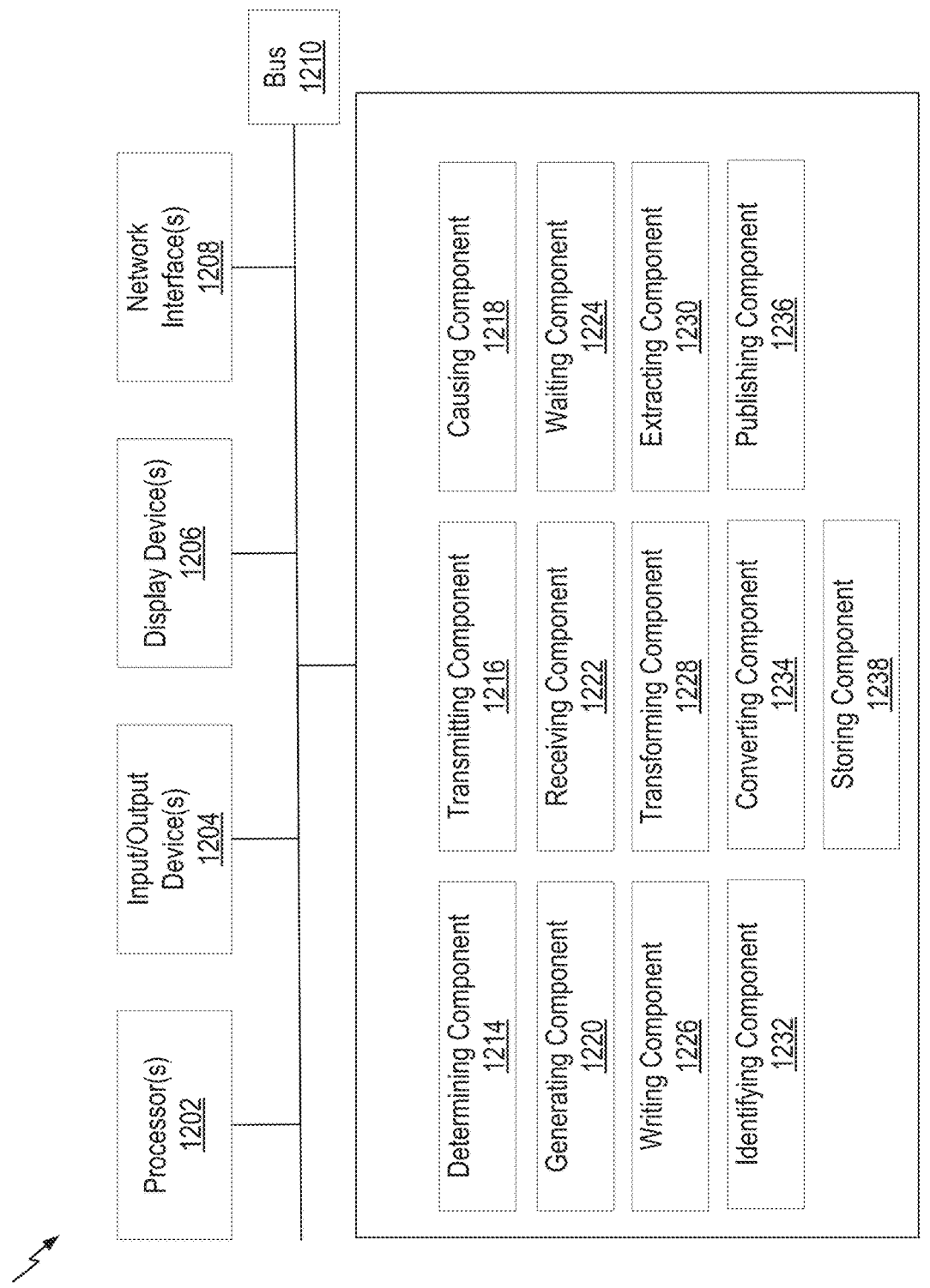
FIG. 12 depicts an example processing system with which aspects of the present disclosure can be performed.

In some aspects, block 1035 is performed by generating component 1220 of FIG. 12 to generate the notification. Additionally, in some aspects, block 1035 is performed by transmitting component 1216 of FIG. 12 to transmit the notification.

In some aspects, method 1000 further includes causing the notification to be displayed at a user interface accessible by a data consumer within two hours of storing the first data table comprising the trigger timestamp. In some aspects, causing the notification to be displayed is performed by causing component 1218 of FIG. 12. For example, causing component 1218 may be configured to cause the notification to be displayed at a user interface such as input/output device 1204 of FIG. 12. This is an improvement over conventional systems and methods that usually incur a delay of approximately 24 hours of the requested system status update.

In some aspects, method 1000 further includes receiving and storing a second commit timestamp in the second data table. In some aspects, receiving and storing the second commit timestamp is performed by receiving component 1222 and storing component 1238 of FIG. 12, respectively. By way of example, receiving component 1222 may be configured to receive a second commit timestamp and store it in trigger adaptor snapshot table 612 of FIG. 6.

In some aspects, method 1000 further includes determining that the second commit timestamp is before the trigger timestamp. In some aspects, determining that the second commit timestamp is before the trigger timestamp may be performed by determining component 1214 of FIG. 12 at poll 610 of FIG. 6. If the latest commit timestamp is earlier than the trigger timestamp, it may mean either 1) that the RDBMS and/or the adaptors are not up-to-date or 2) that no additional changes occurred at the data sources after the time corresponding to the latest commit timestamp. If no additional changes occurred after the latest commit timestamp, then RDMBS and the adaptors are up-to-date.

In some aspects, method 1000 further includes waiting a time out period. In some aspects, waiting the time out period, such as timeout 622 of FIG. 6, is performed by waiting component 1224 of FIG. 12. By waiting a time out period, method 1000 is able to monitor for any new CDC events that are being processed by upstream components of the eventually consistent system.

In some aspects, after waiting the time out period, method 1000 further includes determining that the data lake is up-to-date up to the trigger timestamp. In some aspects, determining that the data lake is up-to-date after waiting the time out period (e.g., timeout 622) may be performed by determining component 1214 of FIG. 12. Alternatively, in some aspects, while waiting the time out period, method 1000 further includes receiving a new commit timestamp during the time out period, wherein based on receiving the new commit timestamp during the time out period, method 1000 further includes determining that the data lake is not up-to-date up to the trigger timestamp.

In some aspects, method 1000 further includes receiving and storing a second adaptor offset in the second data table. In some aspects, receiving and storing the second adaptor offset is performed by receiving component 1222 and storing component 1238 of FIG. 12.

In some aspects, method 1000 further includes receiving and storing a second file writer offset in the third data table. In some aspects, receiving and storing the second file writer offset is performed by receiving component 1222 and storing component 1238 of FIG. 12.

In some aspects, method 1000 further includes determining that the second file writer offset is less than the second adaptor offset. In some aspects, determining that the second file writer offset is less than the second adaptor offset is performed by determining component 1214 of FIG. 12. If the latest file writer offset is less than the latest adaptor offset, it may mean either that the file storage system is not up-to-date as of the trigger timestamp.

To confirm whether the file storage system is up-to-date or not, method 1000 further includes waiting a time out period. In some aspects, waiting the time out period is performed by waiting component 1224 of FIG. 12. In some aspects, method 1000 further includes determining that the data lake is up-to-date up to the trigger timestamp after waiting the time out period. In some aspects, determining that the data lake is up-to-date is performed by determining component 1214 of FIG. 12.

Alternatively, in some aspects, method 1000 further includes receiving a new adaptor offset during the time out period. In some aspects, receiving the new adaptor offset during the time out period is performed by receiving component 1222 of FIG. 12. In such aspects, method 1000 further includes determining that the data lake is not up-to-date up to the trigger timestamp based on receiving the new adaptor offset during the time out period. In some aspects, determining that the data lake is not up-to-date is performed by determining component 1214 of FIG. 12.

In some aspects, method 1000 includes extracting data from the plurality of data files; generating transformed data by transforming the extracted data into a format compatible with the data lake; and writing the transformed data as new files in the data lake. In some aspects, extracting data from the plurality of data files is performed by extracting component 1230 of FIG. 12, generating the transformed data is performed by generating component 12220 of FIG. 12, and writing the transformed data is performed by writing component 1224 of FIG. 12.

In some aspects, method 1000 includes: transmitting the plurality of data files to a materializer configured to extract, transform, and write data to the data lake. By way of example, transmitting component 1216 of FIG. 12 may be configured to transmit a plurality of data files stored in file storage system 140 as job 902 to component 3 of FIG. 9.

Additionally, method 1000 may include identifying a data capacity of the materializer and identifying a data size of the plurality of data files. By way of example, identifying component 1232 may be configured to identify a data capacity of the materializer and a data size of job 902 of FIG. 9. Accordingly, method 1000 can then determine that the data size of the plurality of data files is greater than the data capacity of the materializer. For example, component 3 of FIG. 9 may flag job 902. Based on that determination, method 100—can further include transmitting the plurality of data files in batches of files, wherein each batch (e.g., payload 904 of FIG. 9) of data files has a batch data size that is less than or equal to the data capacity of the materializer.

Alternatively, in some aspects, method 1000 includes determining that the data size of the plurality of data files is less than the data capacity of the materializer, such as flagging job 902 of FIG. 9 as "0". Accordingly, method 1000 can then include transmitting the plurality of data files, without needing to generate batches of the data files, for example, using regular ingestion flow 908 of FIG. 9.

Accordingly, method 1000 achieves many technical benefits over conventional systems and methods associated with data delivery in eventually consistent systems. In particular, the systems and methods described herein provide a way to determine if and when the system is up-to-date by providing a way to track and correlate metadata that is produced in different formats. For example, the present disclosure provides for tracking and comparing commit timestamps against trigger timestamps and tracking and comparing file writer offsets against adaptor offsets to determine if the latest data recorded in a downstream component corresponds to the latest data recorded in preceding component of the eventually consistent system.

Note that FIG. 10 is just one example of a method, and other methods including fewer, additional, or alternative operations are possible consistent with this disclosure.

Example Method for Delivering Consistent Data in an Eventually Consistent System FIG. 11 depicts an example method 1100 for delivering consistent data in an eventually consistent system from the perspective of the eventually consistent system. In one aspect, method 1000 can be implemented by processing system 1200 of FIG. 12.

Method 1100 begins at block 1105 with receiving a plurality of CDC events. In some aspects, block 1105 is performed by receiving component 1222 of FIG. 12. For example, receiving component 1222 may receive CDC events 105 of FIG. 1 from data producers 102.

Method 1100 then proceeds to block 1110 with storing the plurality of CDC events in a database. In some aspects, block 1110 is performed by storing component 1238 of FIG. 12. For example, storing component 1238 may store CDC events 105 in RDBMS 116 of FIG. 1.

Method 1100 then proceeds to block 1115 with converting the plurality of CDC events to a plurality of data messages. In some aspects, block 1115 is performed by converting component 1234 of FIG. 12. For example, converting component 1234 may convert CDC events 105 (or data 109 of FIG. 1) to data messages 111 of FIG. 1.

Method 1100 then proceeds to block 1120 with generating a plurality of commit timestamps when the plurality of CDC events are converted to the plurality of data messages. In some aspects, block 1120 is performed by generating component 1220 of FIG. 12. For example, generating component 1220 may generate a plurality of commit timestamps when CDC events 105 are converted to data messages 111.

Method 1100 then proceeds to block 1125 with publishing the plurality of data messages to a categorized data stream. In some aspects, block 1125 is performed by publishing component 1236 of FIG. 12. For example, publishing component 1236 may publish data messages 111 to categorized data stream 132 of FIG. 1.

Method 1100 then proceeds to block 1130 with generating a plurality of adaptor offsets corresponding to the plurality of data messages when the plurality of data messages is published to the categorized data stream. In some aspects, block 1130 is performed by generating component 1220 of FIG. 12. For example, generating component 1220 may generate a plurality of adaptor offsets when data messages 111 are published to categorized data stream 132.

Method 1100 then proceeds to block 1135 with receiving a first notification that a latest commit timestamp of the plurality of commit timestamps is later than or the same as a trigger timestamp. In some aspects, block 1135 is performed by receiving component 1222 of FIG. 12. For example, receiving component 1222 may receive a notification after poll 610 of FIG. 6 determines that the latest commit timestamp is later than or the same as the trigger timestamp. If the latest commit timestamp is later than or the same as the trigger timestamp, it means that the RDBMS and the adaptors are up to date with the latest CDC events because the last CDC event read by the adaptor is up to date, as of the trigger timestamp, with the latest changes occurring at the data sources.

Method 1100 then proceeds to block 1140 with transmitting the plurality of data messages to a file writer configured to read data messages and write corresponding files to a file storage system. In some aspects, block 1140 is performed by transmitting component 1216 of FIG. 12. For example, transmitting component 1216 may transmit data messages 111 to file writer 138 of FIG. 1.

Method 1100 then proceeds to block 1145 with writing a plurality of files corresponding to the plurality of data messages to the file storage system. In some aspects, block 1145 is performed by writing component 1226 of FIG. 12.

For example, writing component 1226 may cause file writer 138 to write data files 113 to file storage system 140.

Method 1100 then proceeds to block 1150 with generating a plurality of file writer offsets corresponding to the plurality of files written to the file storage system. In some aspects, block 1150 is performed by generating component 1220 of FIG. 12. For example, generating component 1220 may generate a plurality of file writer offsets when data files 113 are written to file storage system 140.

Method 1100 then proceeds to block 1155 with receiving a second notification that a greatest file writer offset of the plurality of file writer offsets is greater than or equal to a greatest adaptor offset of the plurality of adaptor offsets. In some aspects, block 1155 is performed by receiving component 1222 of FIG. 12. For example, receiving component 1222 may receive the second notification after poll 614 of FIG. 6 determines that the greatest file writer offset is greater than the greatest adaptor offset. If the latest file writer offset is greater than or equal to the latest adaptor offset, then the file storage system is up-to-date because it means that the latest data file that was stored in the file storage system corresponds to the latest data message published to the categorized data stream.

Method 1100 then proceeds to block 1160 with transmitting the plurality of files to a data lake based on receiving second notification that the greatest file writer offset of the plurality of file writer offsets is greater than or equal to the greatest adaptor offset of the plurality of adaptor offsets. In some aspects, block 1160 is performed by transmitting component 1216 of FIG. 12. For example, transmitting component 1216 may transmit data files 113 of FIG. 1 and/or data files 115 of FIG. 1 to data warehouse storage system 145 of FIG. 1. Once the file storage system is determined to be up-to-date as of the trigger timestamp, the data files in the file storage system can be materialized into a data lake that is accessible to the data consumer.

Method 1100 then proceeds to block 1165 with receiving a notification comprising an indication that the plurality of files have been transmitted to the data lake. In some aspects, block 1165 is performed by receiving component 1222 of FIG. 12. The data consumer can then access the data in the data lake with confidence knowing that the data lake is up-to-date as of the trigger timestamp. Alternatively, the data consumer can know that the data in the data lake is not up-to-date and either wait until it is or, alternatively, know what time (different than the trigger timestamp) the data lake is up-to-date.

Accordingly, method 1100 provides a way to determine not only if the target endpoint component is up-to-date, but also track intermediary components of the eventually consistent system as well. This is achieved because metadata is recorded at multiple components, such as at the adaptor, the categorized data stream, file writer, and file storage system. As an additional technical improvement over conventional systems, the present disclosure provides a way to communicate to data consumers the status of the eventually consistent system within 2 hours of the requested status update. Conventional systems and methods usually incur a delay of approximately 24 hours of the requested status update. Additionally, systems and methods described herein utilize limited additional computational resources, such as processing and memory storage, because the metadata stored in the various data tables comprise minimal data sizes for storage and are easily and efficiently queried with minimal processing power.

In some aspects, method 1100 further includes converting, by converting component 1234, a new CDC event to a new data message; generating, by generating component 1220, a new commit timestamp when the new CDC event is converted to the new data message; and publishing, by publishing component 1236, the new data message to the categorized data stream, such as categorized data stream 132 of FIG. 1. In some aspects, the new data message is published to a particular partition of the categorized data stream.

In some aspects, method 1100 further includes generating, by generating component 1220, a new adaptor offset corresponding to the new data message when the new data message is published to the categorized data stream and transmitting, by transmitting component 1216, the new data message to the file writer.

In some aspects, method 1100 further includes writing, by writing component 1226, a new file corresponding to the new data message to the file storage system, such as file storage system 140 of FIG. 1, and generating, by generating component 1220, a new file writer offset corresponding to the new file written to the file storage system.

In some aspects, method 1100 further includes receiving, by receiving component 1222, a third notification that the new commit timestamp is before the trigger timestamp. In such aspects, method 1100 further includes waiting a time period, such as waiting component 1224 waiting timeout 622 of FIG. 6, before transmitting the new file to the data lake based on receiving the third notification.

In some aspects, method 1100 further includes converting, by converting component 1234, a new CDC event to a new data message and generating, by generating component 1220, a new commit timestamp when new CDC event is converted to the new data message.

In some aspects, method 1100 further includes determining, by determining component 1214, that the new commit timestamp is later than or the same as the trigger timestamp at poll 610 of FIG. 6.

In some aspects, method 1100 further includes publishing, by publishing component 1236, the new data message to the categorized data stream, such as categorized data stream 132 of FIG. 1. In some aspects, method 1100 further includes generating, by generating component 1220, a new adaptor offset corresponding to the new data message when the new data message is published to the categorized data stream.

In some aspects, method 1100 further includes transmitting, by transmitting component 1216, the new data message to the file writer, such as file writer 138 of FIG. 1. In some aspects, method 1100 further includes writing, by writing component 1226, a new file corresponding to the new data message to the file storage system, such as file storage system 140 of FIG. 1. In some aspects, method 1100 further includes generating, by generating component 1220, a new file writer offset corresponding to the new file written to the file storage system.

In some aspects, method 1100 further includes determining, by determining component 1214, that the new file writer offset is less than the new adaptor offset, for example, at poll 614 of FIG. 6.

In some aspects, method 1100 further includes based on determining that the file writer offset is less than the new adaptor offset, waiting a time period, such as waiting component 1224 waiting timeout period 624 of FIG. 6, before transmitting the new file to the data lake, and determining that the data lake is not up-to-date as of the trigger timestamp. Accordingly, in some aspects, method 1100 further includes generating and transmitting a new notification comprising the indication that the data lake is not up-to-date as of the trigger timestamp.

Thus, method 11000 achieves many technical benefits over conventional systems and methods associated with data delivery in eventually consistent systems. In particular, method 1100 provides a way to determine if and when the system is up-to-date by providing a way to track and correlate metadata that is produced in different formats. For example, aspects of method 1100 are enable tracking and comparing commit timestamps against trigger timestamps and tracking and comparing file writer offsets against adaptor offsets to determine if the latest data recorded in a downstream component corresponds to the latest data recorded in a preceding component of the eventually consistent system.

Furthermore, method 1100 provides a way to determine not only if the target endpoint component is up-to-date, but also track intermediary components of the eventually consistent system as well. This is achieved because metadata is recorded at multiple components, such as at the adaptors, the categorized data streams, the file writer, and the file storage system. Method 1100 also enables the determination that the system is not up-to-date. If the system is not up-to-date as of the trigger timestamp, method 1100 provides a way to determine the actual time that the system is up-to-date.

As an additional technical improvement over conventional systems, method 1100 provides a way to communicate to data consumers the status of the eventually consistent system within a reduced time interval (e.g., 2 hours) of the requested status update. Conventional systems and methods usually incur a delay of approximately 24 hours of the requested status update. Additionally, systems and methods described herein utilize limited additional computational resources, such as processing and memory storage, because the metadata stored in the various data tables comprise minimal data sizes for storage and are easily and efficiently queried with minimal processing power.

Note that FIG. 11 is just one example of a method, and other methods including fewer, additional, or alternative operations are possible consistent with this disclosure.

Example Processing System for Delivering Consistent Data

FIG. 12 depicts an example processing system 1200 configured to perform various aspects described herein, including, for example, method 1000 as described above with respect to FIG. 10 and method 1100 as described above with respect to FIG. 11.

Processing system 1200 is generally be an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 1200 includes one or more processors 1202, one or more input/output devices 1204, one or more display devices 1206, one or more network interfaces 1208 through which processing system 1200 is connected to one or more networks (e.g., a local network, an intranet, the Internet, or any other group of processing systems communicatively connected to each other), and computer-readable medium 1212. In the depicted example, the aforementioned components are coupled by a bus 1210, which may generally be configured for data exchange amongst the components. Bus 1210 may be representative of multiple buses, while only one is depicted for simplicity.

Processor(s) 1202 are generally configured to retrieve and execute instructions stored in one or more memories, including local memories like computer-readable medium 1212, as well as remote memories and data stores. Similarly, processor(s) 1202 are configured to store application data residing in local memories like the computer-readable medium 1212, as well as remote memories and data stores. More generally, bus 1210 is configured to transmit programming instructions and application data among the processor(s) 1202, display device(s) 1206, network interface(s) 1208, and/or computer-readable medium 1212. In certain embodiments, processor(s) 1202 are representative of a one or more central processing units (CPUs), graphics processing unit (GPUs), tensor processing unit (TPUs), accelerators, and other processing devices.

Input/output device(s) 1204 may include any device, mechanism, system, interactive display, and/or various other hardware and software components for communicating information between processing system 1200 and a user of processing system 1200. For example, input/output device(s) 1204 may include input hardware, such as a keyboard, touch screen, button, microphone, speaker, and/or other device for receiving inputs from the user and sending outputs to the user.

Display device(s) 1206 may generally include any sort of device configured to display data, information, graphics, user interface elements, and the like to a user. For example, display device(s) 1206 may include internal and external displays such as an internal display of a tablet computer or an external display for a server computer or a projector. Display device(s) 1206 may further include displays for devices, such as augmented, virtual, and/or extended reality devices. In various embodiments, display device(s) 1206 may be configured to display a graphical user interface.

Network interface(s) 1208 provide processing system 1200 with access to external networks and thereby to external processing systems. Network interface(s) 1208 can generally be any hardware and/or software capable of transmitting and/or receiving data via a wired or wireless network connection. Accordingly, network interface(s) 1208 can include a communication transceiver for sending and/or receiving any wired and/or wireless communication.

Computer-readable medium 1212 may be a volatile memory, such as a random access memory (RAM), or a nonvolatile memory, such as nonvolatile random access memory (NVRAM), or the like. In this example, computer-readable medium 1212 includes determining component 1214, transmitting component 1216, causing component 1218, generating component 1220, receiving component 1222, waiting component 1224, writing component 1226, transforming component 1228, extracting component 1230, identifying component 1232, converting component 1234, publishing component 1236, and storing component 1238. Processing of the components 1214-1238 may enable and cause the processing system 1200 to perform the method 1000 described with respect to FIG. 10, or any aspect related to it and method 1100 described with respect to FIG. 11, or any aspect related to it.

In certain embodiments, storing component 1238 is configured to store a first data table comprising a trigger timestamp, as described in FIG. 10 with reference to block 1005. In certain embodiments, storing component 1238 is configured to store a second data table comprising a commit timestamp and an adaptor offset corresponding to a latest CDC event recorded in a categorized data stream, as described in FIG. 10 with reference to block 1010. In certain embodiments, determining component 1214 is configured to determine that the commit timestamp is later than or the same as the trigger timestamp, as described in FIG. 10 with reference to block 1015. In certain embodiments, storing component 1238 is configured to store a third data table comprising a file writer offset corresponding to a latest data file of a plurality of data files stored in a file storage system, as described in FIG. 10 with reference to block 1020. In certain embodiments, determining component 1214 is configured to determine that the file writer offset is greater than or equal to the adaptor offset, as described in FIG. 10 with reference to block 1025.

In certain embodiments, causing component 1218 is configured to cause the plurality of data files stored in the file storage system to be transmitted to and stored in a data lake, as described in FIG. 10 with reference to block 1030. In certain embodiments, generating component 1220 is configured to generate a notification comprising an indication that the data lake is up-to-date as of the trigger timestamp, as described in FIG. 10 with reference to block 1035. In certain embodiments, transmitting component 1216 is configured to transmit a notification comprising an indication that the data lake is up-to-date as of the trigger timestamp, as described in FIG. 10 with reference to block 1035.

In certain embodiments, receiving component 1222 is configured to receive a plurality of CDC events, as described in FIG. 11 with reference to block 1105. In certain embodiments, storing component 1238 is configured to store plurality of CDC events in a database, as described in FIG. 11 with reference to block 1110. In certain embodiments, converting component 1234 is configured to convert the plurality of CDC events to a plurality of data messages, as described in FIG. 11 with reference to block 1115. In certain embodiments, generating component 1220 is configured to generate a plurality of commit timestamps when the plurality of CDC events are converted to the plurality of data messages, as described in FIG. 11 with reference to block 1120. In certain embodiments, publishing component 1236 is configured to publish the plurality of data messages to a categorized data stream, as described in FIG. 11 with reference to block 1125.

In certain embodiments, generating component 1220 is configured to generate a plurality of adaptor offsets corresponding to the plurality of data messages when the plurality of data messages is published to the categorized data stream, as described in FIG. 11 with reference to block 1130. In certain embodiments, receiving component 1222 is configured to receive a first notification that a latest commit timestamp of the plurality of commit timestamps is later than or the same as a trigger timestamp, as described in FIG. 11 with reference to block 1135. In certain embodiments, transmitting component 1216 is configured to transmit the plurality of data messages to a file writer configured to read data messages and write corresponding files to a file storage system, as described in FIG. 11 with reference to block 1140. In certain embodiments, writing component 1226 is configured to write a plurality of files corresponding to the plurality of data messages to the file storage system, as described in FIG. 11 with reference to block 1145. In certain embodiments, generating component 1220 is configured to generate a plurality of file writer offsets corresponding to the plurality of files written to the file storage system, as described in FIG. 11 with reference to block 1150.

In certain embodiments, receiving component 1222 is configured to receive a second notification that a greatest file writer offset of the plurality of file writer offsets is greater than or equal to a greatest adaptor offset of the plurality of adaptor offsets, as described in FIG. 11 with reference to block 1155. In certain embodiments, transmitting component 1216 is configured to transmit the plurality of files to a data lake based on receiving the second notification that the greatest file writer offset of the plurality of file writer offsets is greater than or equal to the greatest adaptor offset of the plurality of adaptor offsets, as described in FIG. 11 with reference to block 1160. In certain embodiments, receiving component 1222 is configured to receive a notification comprising an indication that the plurality of files have been transmitted to the data lake, as described in FIG. 11 with reference to block 1165.

Note that FIG. 12 is just one example of a processing system consistent with aspects described herein, and other processing systems having additional, alternative, or fewer components are possible consistent with this disclosure.

Example Clauses

Implementation examples are described in the following numbered clauses:

Clause 1: A computer-implemented method for delivering consistent data in an eventually consistent system, comprising: storing a first data table comprising a trigger timestamp; storing a second data table comprising a commit timestamp and an adaptor offset corresponding to a latest CDC event recorded in a categorized data stream; determining that the commit timestamp is later than or the same as the trigger timestamp; storing a third data table comprising a file writer offset corresponding to a latest data file of a plurality of data files stored in a file storage system; determining that the file writer offset is greater than or equal to the adaptor offset; causing the plurality of data files stored in the file storage system to be transmitted to and stored in a data lake; and generating and transmitting a notification comprising an indication that the data lake is up-to-date as of the trigger timestamp.

Clause 2: The computer-implemented method of Clause 1, further comprising causing the notification to be displayed at a user interface accessible by a data consumer within two hours of storing the first data table comprising the trigger timestamp.

Clause 3: The computer-implemented method of any one of Clauses 1-2, further comprising: receiving and storing a second commit timestamp in the second data table; determining that the second commit timestamp is before the trigger timestamp; waiting a time out period; and determining that the data lake is up-to-date up to the trigger timestamp after waiting the time out period.

Clause 4: The computer-implemented method of any one of Clauses 1-3, further comprising: receiving and storing a second commit timestamp in the second data table; determining that the second commit timestamp is before the trigger timestamp; waiting a time out period; receiving a new commit timestamp during the time out period; and determining that the data lake is not up-to-date up to the trigger timestamp.

Clause 5: The computer-implemented method of any one of Clauses 1-4, further comprising: receiving and storing a second adaptor offset in the second data table; receiving and storing a second file writer offset in the third data table; determining that the second file writer offset is less than the second adaptor offset; waiting a time out period; and determining that the data lake is up-to-date up to the trigger timestamp after waiting the time out period.

Clause 6: The computer-implemented method of any one of Clauses 1-5, further comprising: receiving and storing a second adaptor offset in the second data table; receiving and storing a second file writer offset in the third data table; determining that the second file writer offset is less than the second adaptor offset; waiting a time out period; receiving a new adaptor offset during the time out period; and determining that the data lake is not up-to-date up to the trigger timestamp based on receiving the new adaptor offset during the time out period.

Clause 7: The method of any one of Clauses 1-6, wherein causing the plurality of data files stored in the file storage system to be transmitted to and stored in the data lake comprises: extracting data from the plurality of data files; generating transformed data by transforming the extracted data into a format compatible with the data lake; and writing the transformed data as new files in the data lake.

Clause 8: The method of any one of Clauses 1-7, wherein causing the plurality of data files stored in the file storage system to be transmitted to and stored in the data lake comprises: transmitting the plurality of data files to a materializer configured to extract, transform, and write data to the data lake; identifying a data capacity of the materializer; identifying a data size of the plurality of data files; determining that the data size of the plurality of data files is greater than the data capacity of the materializer; and transmitting the plurality of data files in batches of files, wherein each batch of data files has a batch data size that is less than or equal to the data capacity of the materializer.

Clause 9: The method of any one of Clauses 1-8, wherein causing the plurality of data files stored in the file storage system to be transmitted to and stored in the data lake comprises: transmitting the plurality of data files to a materializer configured to extract, transform, and write data to the data lake; identifying a data capacity of the materializer; identifying a data size of the plurality of data files; determining that the data size of the plurality of data files is less than the data capacity of the materializer; and transmitting the plurality of data files.

Clause 10: A computer-implemented method for delivering consistent data in an eventually consistent system, comprising: receiving a plurality of CDC events; storing the plurality of CDC events in a database; converting the plurality of CDC events to a plurality of data messages; generating a plurality of commit timestamps when the plurality of CDC events are converted to the plurality of data messages; publishing the plurality of data messages to a categorized data stream; generating a plurality of adaptor offsets corresponding to the plurality of data messages when the plurality of data messages is published to the categorized data stream; receiving a first notification that a latest commit timestamp of the plurality of commit timestamps is later than or the same as a trigger timestamp; transmitting the plurality of data messages to a file writer configured to read data messages and write corresponding files to a file storage system; writing a plurality of files corresponding to the plurality of data messages to the file storage system; generating a plurality of file writer offsets corresponding to the plurality of files written to the file storage system; receiving a second notification that a greatest file writer offset of the plurality of file writer offsets is greater than or equal to a greatest adaptor offset of the plurality of adaptor offsets; transmitting the plurality of files to a data lake based on receiving the second notification that the greatest file writer offset of the plurality of file writer offsets is greater than or equal to the greatest adaptor offset of the plurality of adaptor offsets; and receiving a notification comprising an indication that the plurality of files have been transmitted to the data lake.

Clause 11: The computer-implemented method of Clause 10, further comprising: converting a new CDC event to a new data message; generating a new commit timestamp when the new CDC event is converted to the new data message; publishing the new data message to the categorized data stream; generating a new adaptor offset corresponding to the new data message when the new data message is published to the categorized data stream; transmitting the new data message to the file writer; writing a new file corresponding to the new data message to the file storage system; generating a new file writer offset corresponding to the new file written to the file storage system. receiving a third notification that the new commit timestamp is before the trigger timestamp; and waiting a time period before transmitting the new file to the data lake based on receiving the third notification.

Clause 12: The computer-implemented method of any one of Clauses 10-11, further comprising: converting a new CDC event to a new data message; generating a new commit timestamp when new CDC event is converted to the new data message; publishing the new data message to the categorized data stream; generating a new adaptor offset corresponding to the new data message when the new data message is published to the categorized data stream; transmitting the new data message to the file writer; writing a new file corresponding to the new data message to the file storage system; generating a new file writer offset corresponding to the new file written to the file storage system; determining that the new commit timestamp is later than or the same as the trigger timestamp; determining that the new file writer offset is less than the new adaptor offset; based on determining that the file writer offset is less than the new adaptor offset: waiting a time period before transmitting the new file to the data lake, and determining that the data lake is not up-to-date as of the trigger timestamp; and generating and transmitting a new notification comprising the indication that the data lake is not up-to-date as of the trigger timestamp.

Clause 13: The method of any one of Clauses 10-12, wherein the plurality of data messages are published to one or more partitions of the categorized data stream.

Clause 14: A processing system, comprising: memory comprising computer-executable instructions; and one or more processors configured to execute the computer-executable instructions and cause the processing system to perform a method in accordance with any one of Clauses 1-13.

Clause 15: A processing system, comprising means for performing a method in accordance with any one of Clauses 1-13.

Clause 16: A non-transitory computer-readable medium storing program code for causing a processing system to perform the steps of any one of Clauses 1-13.

Clause 17: A computer program product embodied on a computer-readable storage medium comprising code for performing a method in accordance with any one of Clauses 1-13.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for delivering consistent data in an eventually consistent system, comprising:

storing a first data table comprising a trigger timestamp;

storing a second data table comprising a commit timestamp and an adaptor offset corresponding to a latest change data capture (CDC) event recorded in a categorized data stream;

determining that the commit timestamp is later than or the same as the trigger timestamp;

storing a third data table comprising a file writer offset corresponding to a latest data file of a plurality of data files stored in a file storage system;

determining that the file writer offset is greater than or equal to the adaptor offset;

causing the plurality of data files stored in the file storage system to be transmitted to and stored in a data lake as new files comprising transformed data extracted from the plurality of data files; and generating and transmitting a notification comprising an indication that the data lake is up-to-date as of the trigger timestamp.

2. The computer-implemented method of claim 1, further comprising causing the notification to be displayed at a user interface accessible by a data consumer within two hours of storing the first data table comprising the trigger timestamp.

3. The computer-implemented method of claim 1, further comprising:

receiving and storing a second commit timestamp in the second data table;

determining that the second commit timestamp is before the trigger timestamp;

waiting a time out period; and after waiting the time out period, determining that the data lake is up-to-date up to the trigger timestamp.

4. The computer-implemented method of claim 1, further comprising:

receiving and storing a second commit timestamp in the second data table;

determining that the second commit timestamp is before the trigger timestamp;

waiting a time out period;

receiving a new commit timestamp during the time out period; and determining that the data lake is not up-to-date up to the trigger timestamp.

5. The computer-implemented method of claim 1, further comprising:

receiving and storing a second adaptor offset in the second data table;

receiving and storing a second file writer offset in the third data table;

determining that the second file writer offset is less than the second adaptor offset;

waiting a time out period; and after waiting the time out period, determining that the data lake is up-to-date up to the trigger timestamp.

6. The computer-implemented method of claim 1, further comprising:

receiving and storing a second adaptor offset in the second data table;

receiving and storing a second file writer offset in the third data table;

determining that the second file writer offset is less than the second adaptor offset;

waiting a time out period;

receiving a new adaptor offset during the time out period; and based on receiving the new adaptor offset during the time out period, determining that the data lake is not up-to-date up to the trigger timestamp.

7. The computer-implemented method of claim 1, wherein causing the plurality of data files stored in the file storage system to be transmitted to and stored in the data lake comprises:

extracting data from the plurality of data files;

generating the transformed data by transforming the extracted data into a format compatible with the data lake; and writing the transformed data as the new files in the data lake.

8. The computer-implemented method of claim 1, wherein causing the plurality of data files stored in the file storage system to be transmitted to and stored in the data lake comprises:

transmitting the plurality of data files to a materializer configured to extract, transform, and write data to the data lake;

identifying a data capacity of the materializer;

identifying a data size of the plurality of data files;

determining that the data size of the plurality of data files is greater than the data capacity of the materializer; and transmitting the plurality of data files in batches of files, wherein each batch of data files has a batch data size that is less than or equal to the data capacity of the materializer.

9. The computer-implemented method of claim 1, wherein causing the plurality of data files stored in the file storage system to be transmitted to and stored in the data lake comprises:

transmitting the plurality of data files to a materializer configured to extract, transform, and write data to the data lake;

identifying a data capacity of the materializer;

identifying a data size of the plurality of data files;

determining that the data size of the plurality of data files is less than the data capacity of the materializer; and transmitting the plurality of data files.

10. A processing system comprising one or more memories comprising computer-executable instructions; and one or more processors configured to execute the computer-executable instructions and cause the processing system to:

store a first data table comprising a trigger timestamp;

store a second data table comprising a commit timestamp and an adaptor offset corresponding to a latest change data capture (CDC) event recorded in a categorized data stream;

determine that the commit timestamp is later than or the same as the trigger timestamp;

store a third data table comprising a file writer offset corresponding to a latest data file of a plurality of data files stored in a file storage system;

determine that the file writer offset is greater than or equal to the adaptor offset;

cause the plurality of data files stored in the file storage system to be transmitted to and stored in a data lake as new files comprising transformed data extracted from the plurality of data files; and generate and transmit a notification comprising an indication that the data lake is up-to-date as of the trigger timestamp.

11. The processing system of claim 10, wherein the processing system is further caused to:

cause the notification to be displayed at a user interface accessible by a data consumer within two hours of storing the first data table comprising the trigger timestamp.

12. The processing system of claim 10, wherein the processing system is further caused to:

receive and store a second commit timestamp in the second data table;

determine that the second commit timestamp is before the trigger timestamp;

wait a time out period; and determine that the data lake is up-to-date up to the trigger timestamp after waiting the time out period.

13. The processing system of claim 10, wherein the processing system is further caused to:

receive and store a second commit timestamp in the second data table;

determine that the second commit timestamp is before the trigger timestamp;

wait a time out period;

receive a new commit timestamp during the time out period; and determine that the data lake is not up-to-date up to the trigger timestamp.

14. The processing system of claim 10, wherein the processing system is further caused to:

receive and store a second adaptor offset in the second data table;

receive and store a second file writer offset in the third data table;

determine that the second file writer offset is less than the second adaptor offset;

wait a time out period; and determine that the data lake is up-to-date up to the trigger timestamp after waiting the time out period.

15. The processing system of claim 10, wherein the processing system is further caused to:

receive and store a second adaptor offset in the second data table;

receive and store a second file writer offset in the third data table;

determine that the second file writer offset is less than the second adaptor offset;

wait a time out period;

receive a new adaptor offset during the time out period; and determine that the data lake is not up-to-date up to the trigger timestamp based on receiving the new adaptor offset during the time out period.

16. The processing system of claim 10, wherein to cause the processing system to cause the plurality of data files stored in the file storage system to be transmitted to and stored in the data lake, the one or more processors are configured to cause the processing system to:

extract data from the plurality of data files;

generate the transformed data by transforming the extracted data into a format compatible with the data lake; and write the transformed data as the new files in the data lake.

17. A computer-implemented method for delivering consistent data in an eventually consistent system, comprising:

receiving a plurality of change data capture (CDC) events;

storing the plurality of CDC events in a database;

converting the plurality of CDC events to a plurality of data messages;

generating a plurality of commit timestamps when the plurality of CDC events are converted to the plurality of data messages;

publishing the plurality of data messages to a categorized data stream;

generating a plurality of adaptor offsets corresponding to the plurality of data messages when the plurality of data messages is published to the categorized data stream;

receiving a first notification that a latest commit timestamp of the plurality of commit timestamps is later than or the same as a trigger timestamp;

transmitting the plurality of data messages to a file writer configured to read data messages and write corresponding files to a file storage system;

writing a plurality of files corresponding to the plurality of data messages to the file storage system;

generating a plurality of file writer offsets corresponding to the plurality of files written to the file storage system;

receiving a second notification that a greatest file writer offset of the plurality of file writer offsets is greater than or equal to a greatest adaptor offset of the plurality of adaptor offsets;

based on receiving the second notification that the greatest file writer offset of the plurality of file writer offsets is greater than or equal to the greatest adaptor offset of the plurality of adaptor offsets, transmitting the plurality of files to a data lake; and receiving a notification comprising an indication that the plurality of files have been transmitted to the data lake.

18. The computer-implemented method of claim 17, further comprising:

converting a new CDC event to a new data message;

generating a new commit timestamp when the new CDC event is converted to the new data message;

publishing the new data message to the categorized data stream;

generating a new adaptor offset corresponding to the new data message when the new data message is published to the categorized data stream;

transmitting the new data message to the file writer;

writing a new file corresponding to the new data message to the file storage system;

generating a new file writer offset corresponding to the new file written to the file storage system;

receiving a third notification that the new commit timestamp is before the trigger timestamp; and based on receiving the third notification, waiting a time period before transmitting the new file to the data lake.

19. The computer-implemented method of claim 17, further comprising:

converting a new CDC event to a new data message;

generating a new commit timestamp when new CDC event is converted to the new data message;

publishing the new data message to the categorized data stream;

generating a new adaptor offset corresponding to the new data message when the new data message is published to the categorized data stream;

transmitting the new data message to the file writer;

writing a new file corresponding to the new data message to the file storage system;

generating a new file writer offset corresponding to the new file written to the file storage system;

determining that the new commit timestamp is later than or the same as the trigger timestamp;

determining that the new file writer offset is less than the new adaptor offset;

based on determining that the new file writer offset is less than the new adaptor offset, waiting a time period before transmitting the new file to the data lake, and determining that the data lake is not up-to-date as of the trigger timestamp; and generating and transmitting a new notification comprising the indication that the data lake is not up-to-date as of the trigger timestamp.

20. The computer-implemented method of claim 17, wherein the plurality of data messages are published to one or more partitions of the categorized data stream.

\* \* \* \* \*